(12) United States Patent
Grobe et al.

(10) Patent No.: US 8,705,952 B2
(45) Date of Patent: Apr. 22, 2014

(54) OPTICAL WAVELENGTH DIVISION MULTIPLEX (WDM) TRANSMISSION SYSTEM

(75) Inventors: Klaus Grobe, Planegg (DE); Jörg-Peter Elbers, Furstenfeldbruck (DE); Michael Eiselt, Kirchheim (DE); Markus Roppelt, Karlsruhe (DE)

(73) Assignee: ADVA AG Optical Networking, Meiningen, DE (US)

( * ) Notice: Subject to any disclaimer, the term of this patent is extended or adjusted under 35 U.S.C. 154(b) by 166 days.

(21) Appl. No.: 13/328,759

(22) Filed: Dec. 16, 2011

(65) Prior Publication Data
US 2013/0089319 A1 Apr. 11, 2013

(30) Foreign Application Priority Data

May 20, 2011 (EP) .................................... 11401524

(51) Int. Cl.
*H04J 14/00* (2006.01)
(52) U.S. Cl.
USPC ............. 398/7; 398/1; 398/5; 398/48; 398/79
(58) Field of Classification Search
None
See application file for complete search history.

(56) References Cited

U.S. PATENT DOCUMENTS

2009/0232501 A1* 9/2009 Dai ................................ 398/66

FOREIGN PATENT DOCUMENTS

| EP | 1 628 423 A1 | 2/2006 | |
|---|---|---|---|
| EP | 1628423 A1 * | 2/2006 | ............... H04J 14/02 |

OTHER PUBLICATIONS

Wang, Xinzhu; Wang, Suyi; Zhang, Ao; Wang, Jianli, "A novel highly reliable WDM-PON system," Communications and Photonics Conference and Exhibition (ACP), 2009 Asia, vol. 2009—Supplement, no., pp. 1,10, Nov. 2-6, 2009.*
European Search Report issued in EP 11401524 mailed Nov. 2, 2011; 9 pages.
Xinzhu Wang et al: "A Novel Highly Reliable WDM-PON System", Asia Communications and Photonics Conference and Exhibition, Nov. 2, 2009, 10 pages, SPIE-OSA-IEE/Vol. 7633 76331V-10, XP031623404, Piscataway, NJ, USA.
Kwanil Lee et al: "A Self-Restorable Architecture for Bidirectional Wavelength-Division-Multiplexed Passive Optical Network With Colorless ONUs", Optics Express, Apr. 4, 2007, 6 pages, vol. 15, No. 8, p. 4863, XP55009452.
Calvin C K Chan et al: "Novel Network Architectures for Survivable WDM Passive Optical Networks", Optical Communication 2008. ECOC 2008, Sep. 21, 2008, 4 pages, XP031381168, Piscataway, NJ, USA.

* cited by examiner

*Primary Examiner* — Ken Vanderpuye
*Assistant Examiner* — Merlin Brito Peguero
(74) *Attorney, Agent, or Firm* — Additon, Higgins, Pendleton & Ashe, P.A.

(57) ABSTRACT

The present invention embraces an optical wavelength division multiplex (WDM) transmission system, especially a WDM passive optical network, typically including a central node having a first and a second WDM port and a remote node having a first and a second WDM port and a plurality of channel ports, the central node first WDM port being connected to the remote node first WDM port via a bidirectional single-fiber optical working path and the central node second WDM port being connected to the remote node second WDM port via a single-fiber bidirectional optical protection path, and a group of basic optical node units (ONU's) each of which is connected to a respective remote node channel port via a bidirectional optical ONU path, each ONU including an optical receiver for receiving a downstream optical channel signal and an optical tunable transmitter for creating an upstream channel signal.

16 Claims, 8 Drawing Sheets

OPTICAL WAVELENGTH DIVISION MULTIPLEX (WDM) TRANSMISSION SYSTEM

CROSS-REFERENCE TO PRIORITY APPLICATION

This application is a continuation of and claims priority to the commonly assigned European Patent Application Serial No. 11 401 524 (filed May 20, 2011, in the European Patent Office), which is hereby incorporated by reference in its entirety.

FIELD OF THE INVENTION

The invention relates to an optical wavelength division multiplex (WDM) transmission system, especially a WDM passive optical network.

BACKGROUND

WDM passive optical networks (PON) have become more and more important as optical distribution networks (ODNs) for distributing optical transmission signals between a central node, e.g. an optical line terminal (OLT) and one or more remote nodes. Often, a bidirectional path in the form of a single fiber connection between the central node and a remote node is used in order to save optical fibers. A bidirectional WDM signal (downstream and upstream WDM signal) is transmitted over the optical link between the central and each remote node. A plurality of optical node units (ONUs) is connected to each remote node. Again, this connection is usually realized by using a bidirectional single fiber connection. In general, only a single channel signal (upstream and downstream channel signal) is used for transmitting the data between the respective ONU and the central node, realizing a point-to-point data link. In order to facilitate the network design, different wavelength bands are used for the downstream and upstream WDM signals between the central node and the remote nodes, and different wavelengths are used for the downstream and upstream channel signals between a remote node and an ONU. Of course, in addition to the bidirectional channel signal, a broadcast signal may be transmitted from the central node to a remote node and to selected or all ONUs.

A plurality of customer signals are aggregated on the trunk or feeder fibers between the central node and a remote node. Therefore, this transmission link needs to be protected. In order to save costs for implementing a protection mechanism, it is desirable to do that without duplicating the optical transceivers in the central node.

An advantageous protection scheme can be implemented by using cyclic 2×N arrayed waveguide gratings (AWGs), i.e. arrayed waveguide gratings having two cyclic WDM ports and a given number of N channel ports. Due to the physics of an AWG, the wavelengths of all channel signals fed to the channel ports must be shifted by one or more channel spacings in order to switch the respective WDM signal from the respective cyclic WDM port to the other cyclic WDM port. The necessary shift depends on the construction of the AWG. In the simplest case, the necessary shift equals a single channel spacing, i.e. the wavelength of each channel signal must be shifted by an amount of a single channel spacing in order to switch the respective WDM signal (including the shifted channel signals) from the respective cyclic WDM port to the other cyclic WDM port. As an AWG has a predefined free spectral range, the channel ports define optical paths for signals at wavelengths differing by an integer multiple of the free spectral range. This property can be used for using the same AWG in order to multiplex or demultiplex downstream and upstream channels that lie in different wavelength bands. For example, a first upstream channel signal may have a wavelength that equals the first downstream channel signal plus or minus the free spectral range of the AWG.

This principle is used in Kwanil Llee et al, "A self-restorable architecture for bidirectional wavelength-division-multiplexed passive optical network with colorless ONUs", OSA OPTICS EPRESS 4863, Vol. 15, No. 8. This proposed ODN in the form of a WDM-PON includes a cyclic 2×N AWG in the central node and in the remote node. Colorless ONUs are realized by using Fabry-Perot laser diodes in the central node and the ONUs which are wavelength-locked to an injected spectrum-sliced amplified spontaneous emission (ASE) light. For this, two broadband light sources are coupled to a trunk fiber in opposite directions, the trunk fiber being located between the common ports of two optical 1×2 switches, each of the two switched ports of the first 1×2 switch being coupled to a respective cyclic WDM port of the 2×N AWG, and each of the two switched ports of the second 1×2 switch being coupled to a WDM working port and a WDM protection port of the central node, respectively. In the case of detecting, at the central node, a loss of light of the received (upstream) WDM working signal, the wavelengths of the downstream channel signals are shifted so that the downstream WDM working signal is output at the respective other cyclic WDM port of the 2×N AWG. Simultaneously, the two 1×2 switches are controlled to switch to the respective other switched port so that the downstream WDM working signal is transmitted over the protection fiber between the central node, and the remote node and the upstream WDM signal, due to a respective shifting of the wavelength of the Fabry-Perot lasers in the ONUs, is output at the cyclic WDM port of the remote node 2×N AWG being connected to the protection fiber and thus transmitted to the transceivers coupled to the channel ports of the central node 2×N AWG in the desired manner.

However, this WDM-PON network design requires two broadband light sources and two optical 1×2 switches having a corresponding insert loss.

The same is true for WDM-PON architectures using 3 dB couplers in order to split the WDM signals to be transmitted over a working fiber and a protection fiber, respectively (see e.g. Calvin CK Chan et al., "Novel Network Architectures for Survivable WDM Passive Optical Networks", ECOC 2008, paper Th.1.F.6).

Further, known WDM-PON architectures do not provide for easily increasing the number of channels and the number of ONUs that may be coupled to the remote node (and thus to the central node).

SUMMARY

It is thus an object of the present invention to provide an optical wavelength division multiplex (WDM) transmission system, especially a WDM passive optical network, without the need of using 3 dB couplers or optical switches in the central and remote nodes and which reveals a structure which may easily be extended to an increased number of ONUs or wavelength channels, respectively.

The invention achieves this object with the combination of features according to claim 1.

The invention starts from the finding that using controllable tunable optical transmitters in the central node and the remote node which are at least tunable over a spectral range of at least one channel spacing (or an integer multiple of the channel spacing defined by the two cyclic WDM output ports of the cyclic multiplexer and band separator/combiner device, i.e. the frequency difference that must be added/subtracted to the optical frequencies of the channel signals in order to switch these from one of the cyclic WDM output ports to the other) allows to develop a design for the central node and the remote node without the need of using 3 dB couplers or optical switches and which may easily be extended in the number of channels. The tuning of the optical tunable transmitters (in the central node and the remote node) causes effort but is not a principle problem. The additional effort is, however, of less importance than the advantages of the new network design, especially its flexibility with respect to an extension.

As various principles for the tuning of the transmitters are known, these are not addressed in the following. It shall be sufficient to mention that the protection control unit is adapted to detect a failure within the working path or within the working path and the protection path and to control the central node tunable optical transmitters and the ONU tunable optical transmitters such that they are shifted from the present working or protection wavelengths to the respective protection wavelengths or vice versa.

The term "tunable" optical transmitters shall, in the following, cover all types of tunable optical transmitters which directly receive a control signal influencing the wavelength of the output signal. This term does not include "automatically" tuned optical transmitters, e.g. any type of injected (from an injection light source external to the transmitter module) optical transmitters, like Fabry-Perot lasers that are wavelength-locked to a spectrum-sliced light created by an external broadband source and filtered by the respective AWG as described in Kwanil Lee et al, "A self-restorable architecture for bidirectional wavelength-division-multiplexed passive optical network with colorless ONUs", OSA OPTICS EPRESS 4863, Vol. 15, No. 8.

As cost-effective tunable narrow-band light sources, incoherent-light-injected Fabry-Perot laser diode modules or arrays may be used. These are devices with a simple structure and a high yield. Such compact and low-cost light sources allow all optical transmitters to be used interchangeably for any WDM channels, enabling colorless operation in the network. Moreover, the incoherent nature of the output light of a Fabry-Perot laser diode module or array greatly enhances the robustness against in-band optical crosstalk possibly caused by optical reflection and Rayleigh backscattering.

According to the invention, the central node optical transmitters are directly coupled to channel ports of the cyclic multiplexer and band separator/combiner device, which might be realized, in the simplest case, by a single cyclic 2×N-port AWG. This enables the use of further channels in different bands. The signals in each band are combined by a separate cyclic multiplexer and the various bands or WDM downstream and upstream signals are combined or separated by a simple band separator/combiner device, like optical diplexers or optical circulators.

According to an embodiment of the invention (claim 2), the remote node includes a cyclic channel multiplexer, defining identical basic upstream and downstream channels as the basic cyclic multiplexer and band separator/combiner device of the central node, the cyclic channel multiplexer having a free spectral range being defined so that the optical frequency difference of corresponding downstream and upstream channel signals is an integer multiple of the free spectral range of the basic cyclic multiplexer, the cyclic multiplexer adapted:

for receiving the basic upstream channel signals at the remote node channel ports and for multiplexing the basic upstream channel signals, if created at the upstream channel working wavelengths, into a basic upstream WDM working signal and for outputting the basic upstream WDM working signal at the remote node first WDM port, and for multiplexing the basic upstream channel signals, if created at the basic upstream channel protection wavelengths, into a basic upstream WDM protection signal, and for outputting the basic upstream WDM protection signal at the remote node second WDM port, and for receiving the basic downstream WDM working signal at the remote node first WDM port or a basic downstream WDM protection signal at the remote node second WDM port and for demultiplexing the basic WDM working signal or the basic WDM protection signal into the basic downstream channel signals and for feeding each of the basic upstream channel signals to the remote node channel ports.

Using the free spectral range periodicity of the cyclic channel multiplexer, especially a cyclic 2×N-port AWG, the downstream signals and the upstream signals can be transmitted in different bands without the need of using additional optical components.

According to a further embodiment (claim 3), the central node basic cyclic multiplexer and band separator/combiner device includes:

a first cyclic channel multiplexer having a given number of channel ports and a first and a second cyclic WDM port, the channel ports being connected to the group of basic optical tunable transmitters;

a second cyclic channel multiplexer having a given number of channel ports and a first and a second cyclic WDM port, the channel ports being connected to the group of basic optical receivers, a first optical band separator/combiner for receiving, at a first band port, the basic downstream WDM working signal from the first cyclic WDM port of the first cyclic channel multiplexer and outputting the basic downstream WDM working signal at a WDM port, only, and for receiving, at the WDM port, the basic upstream WDM working signal and outputting the basic upstream WDM working signal at a second band port, only, the second band port being connected to the first cyclic WDM port of the second cyclic channel multiplexer, and a second optical band separator/combiner for receiving, at a first band port, the basic downstream WDM protection signal from the second cyclic WDM port of the first cyclic channel multiplexer and outputting the basic downstream WDM working signal at a WDM port, only, and for receiving, at the WDM port, the basic upstream WDM protection signal and outputting the basic upstream WDM protection signal at a second band port, only, the second band port being connected to the second cyclic WDM port of the second cyclic channel multiplexer.

This results in a very simple basic structure of the central node which may easily be extended to an increased number of channels, as briefly explained above.

According to an extended embodiment (claim 4), the central node may further include:

a group of extension tunable optical transmitters for creating a further group of extension downstream channel signals, all of the further extension downstream channel working and protection wavelengths lying within an extension downstream wavelength band, a group of extension optical receivers for receiving a group of extension upstream channel signals created by a group of extension ONUs, all of the extension upstream channel working and protection wavelengths lying within an extension upstream wavelength band, the extension downstream and upstream wavelength bands not overlapping with each other and lying above or below the basic downstream and upstream wavelength bands, an extension cyclic multiplexer and band separator/combiner device for receiving the extension downstream channel signals and for multiplexing the extension downstream channel signals, if created at the extension downstream channel working wavelengths, into an extension downstream WDM working signal, and for multiplexing the downstream channel signals, if created at the downstream channel protection wavelengths, into a downstream WDM protection signal, and for receiving an extension upstream WDM working signal or an extension upstream WDM protection signal and for demultiplexing the extension WDM working signal or the extension WDM protection signal into the extension upstream channel signals, a band separator/combiner for receiving, at a WDM port, the upstream WDM working signal including the basic and extension upstream channel signals from the central node first WDM port and for outputting, at a first band port, the basic upstream WDM working signal and, at a second band port, the extension upstream WDM working signal, and for receiving, at the first band port, the basic downstream WDM working signal, and, at the second band port, the extension downstream WDM working signal, and for outputting, at the WDM port, the downstream WDM working signal, including the basic and extension downstream channel signals, to the central node first WDM port, and a band separator/combiner for receiving, at a WDM port, the upstream WDM protection signal including the basic and extension upstream channel signals from the central node second WDM port and for outputting, at a first band port, the basic upstream WDM protection signal and, at a second band port, the extension upstream WDM protection signal, and for receiving, at the first band port, the basic downstream WDM protection signal, and, at the second band port, the extension downstream WDM protection signal, and for outputting, at the WDM port, the downstream WDM protection signal, including the basic and extension downstream channel signals, to the central node first WDM port.

This is a design for using a further band (the extension band), i.e. additional channels lying in a further band, in addition to a basic band.

A suitable extension of the remote node according to the invention (claim 5) includes a cyclic channel multiplexer and band separator/combiner device defining identical basic upstream and downstream channels and identical extension upstream and downstream channels as the basic cyclic multiplexer and band separator/combiner device and the extension cyclic multiplexer and band separator/combiner device of the central node, the free spectral range of the cyclic channel multiplexer and band separator/combiner device being defined such that the optical frequency difference of corresponding basic and extension downstream and upstream channel signals is an integer multiple of the free spectral range of the cyclic channel multiplexer and band separator/combiner device.

This is again the use of the free spectral range periodicity of the cyclic channel multiplexer and band separator/combiner device, which typically includes a cyclic 2×N-port AWG resulting in a simple design of the remote node.

According to a typical embodiment (claim 6), the cyclic channel multiplexer and band separator/combiner device includes a cyclic channel multiplexer having a first and second WDM port and a given number of channel ports, the first and second WDM port defining the remote node first and second WDM port, respectively, and each of the channel ports being connected to a WDM port of a 3-port optical band separator/combiner for separating and combining channel signals of the basic and the extension bands, a first band port of each 3-port optical band separator/combiner defining a channel port for an ONU for receiving and transmitting in the basic bands and a second band port of each 3-port optical band separator/combiner defining a channel port for an ONU for receiving and transmitting in the extended bands.

This structure of the remote node allows to split the remote node into a first remote node including the cyclic channel multiplexer and into a respective number of second remote nodes each including at least one 3-port optical band separator/combiner. Each of the band ports of the optical separator/combiners can be used to connect an ONU. Thus, this structure is especially useful for connecting two neighboring ONUS, e.g. for a pair of semi-detached houses, each ONU associated to one of the semi-detached houses.

According to an alternative embodiment (claim 7), the cyclic channel multiplexer and band separator/combiner device of the remote node includes a first and a second 3-port optical band separator/combiner having a WDM port defining the remote node first and second WDM port and a first and a second band port for receiving and outputting WDM signals in the basic bands and the extended bands, respectively, the first band ports of the first and second 3-port optical band separator/combiners being connected to a first and a second WDM port of a first cyclic channel multiplexer, respectively, and the second band ports of the first and second 3-port optical band separator/combiners being connected to a first and a second WDM port of a second cyclic channel multiplexer, respectively, the first and second cyclic channel multiplexers having channel ports defining the remote node channel ports.

Thus, the first cyclic channel multiplexer is adapted to be connected to ONUS working in the basic bands and the second cyclic channel multiplexer is adapted to be connected to ONUs working in the extended bands. This structure is appropriate in cases where numerous ONUs are located closely together so that they can be connected via a rather short bidirectional optical ONU path.

According to a further embodiment of the invention (claim 8), the central node further includes a group of interleave tunable optical transmitters creating a group of interleave downstream channel signals at respective interleave working or protection wavelengths lying within the basic downstream band or the extension downstream band, the channel spacing of the interleave downstream channel signals allowing for combining the interleave downstream channel signals with the group of basic or extension downstream channel signals in an interleaving manner.

In this embodiment, the central node basic or extension multiplexer and band separator/combiner device is adapted for receiving the group of interleave downstream channel signals and the group of basic or extension downstream signals, for creating a basic or extension downstream WDM working signal including the basic or extension downstream channel signals at their working wavelengths and an interleave downstream WDM working signal including the interleave downstream channel signals at their working wavelengths, and for combining these two signals in an interleaving manner into an interleaved downstream WDM working signal, and for creating a basic or extension downstream WDM protection signal including the basic or extension downstream channel signals at their protection wavelengths and an interleave downstream WDM protection signal including the interleave downstream channel signals at their protection wavelengths, and for combining these two signals in an interleaving manner into an interleaved downstream WDM protection signal.

The central node further includes a group of interleave or extension optical receivers for receiving a group of interleave upstream channel signals, and the central node basic or extension multiplexer and band separator/combiner device is further adapted for separating a received interleaved upstream WDM working signal into the basic or extension upstream WDM working signal including the basic or extension upstream channel signals and an interleave upstream WDM working signal including interleave upstream channel signals created by a group of interleave ONUs and for demultiplexing the basic or extension upstream WDM working signal and the interleave upstream WDM working signal into the basic or extension upstream channel signals and the interleave upstream channel signals, respectively, and for separating a received interleaved upstream WDM protection signal into the basic or extension upstream WDM protection signal including the basic or extension upstream channel signals and an interleave upstream WDM protection signal including interleave upstream channel signals created by the group of interleave ONUs and for demultiplexing the basic or extension upstream WDM protection signal and the interleave upstream WDM protection signal into the basic or extension upstream channel signals and the interleave upstream channel signals, respectively.

By interleaving the channel signals a narrow channel spacing can be achieved even if cyclic channel multiplexers (within the cyclic multiplexer and band separator/combiner device) are used that have a larger channel spacing.

According to a further embodiment of the invention (claim 9), an appropriate remote node for handling interleaved WDM signals includes a first cyclic channel multiplexer having a given number of channel ports connected to the group of basic or extension ONUs, a first cyclic WDM port for receiving a downstream WDM working signal including the basic or extension channel signals at their working wavelengths or outputting an upstream WDM working signal including the basic or extension channel signals at their working wavelengths, and a second cyclic WDM port for receiving a downstream WDM protection signal including the basic or extension channel signals at their protection wavelengths or outputting an upstream WDM protection signal including the basic or extension channel signals at their protection wavelengths, a second cyclic channel multiplexer having a given number of channel ports connected to the group of interleave ONUs, a first cyclic WDM port for receiving a downstream WDM working signal including the interleave channel signals at their working wavelengths or outputting an upstream WDM working signal including the interleave channel signals at their working wavelengths, and a second cyclic WDM port for receiving a downstream WDM protection signal including the interleave channel signals at their protection wavelengths or outputting an upstream WDM protection signal including the basic or extension channel signals at their interleave wavelengths, a first passive optical interleaver/deinterleaver device
for receiving the interleaved downstream WDM working signal at the remote node first WDM port and separating it into the downstream WDM working signal including the basic or extension channel signals and into the downstream WDM working signal including the interleave channel signals, and for receiving the upstream WDM working signal including the basic or extension channel signals and the upstream WDM working signal including the interleave channel signals and combining these upstream WDM working signals in an interleaving manner into an interleaved upstream WDM working signal which is output at the remote node first WDM port, and a second passive optical interleaver/deinterleaver device
for receiving the interleaved downstream WDM protection signal at the remote node second WDM port and separating it into the downstream WDM protection signal including the basic or extension channel signals and into the downstream WDM protection signal including the interleave channel signals, and for receiving the upstream WDM protection signal including the basic or extension channel signals and the upstream WDM protection signal including the interleave channel signals and combining these upstream WDM working signals in an interleaving manner into an interleaved upstream WDM protection signal which is output at the remote node second WDM port.

According to a respective typical embodiment (claim 10), each of the first and second remote node optical interleaver/deinterleaver device includes a first, a second and a third band separator/combiner device having a WDM port and two band ports, a first band port for outputting or receiving the basic or extension downstream band and a second band port for outputting or receiving the basic or extension upstream band, and an optical interleaver having a common port and a first interleave port for receiving the upstream WDM signal including the basic or extension channel signals and a second interleave port for receiving the upstream WDM signal including the interleave channel signals, and an optical deinterleaver, having a common port and a first interleave port for outputting the downstream WDM signal including the basic or extension channel signals and a second interleave port for outputting the downstream WDM signal including the interleave channel signals, the WDM port of the first band separator/combiner device being connected to the remote node first WDM port, the first band port of the first band separator/combiner device being connected to a common port of the optical interleaver and the second band port being connected to a common port of the optical deinterleaver, the first band port of the second band separator/combiner device being connected to the first band port of the optical deinterleaver, and the second band port of the second band separator/combiner device being connected to the first interleave port of the optical interleaver, and the WDM port of the second band separator/combiner device being connected, in case of the first remote node optical interleaver/deinterleaver device, to the first WDM output port of the first cyclic channel multiplexer, or, in case of the second remote node optical interleaver/deinterleaver device, to the second WDM output port of the first cyclic channel multiplexer, the first band port of the third band separator/combiner device being connected to the second band port of the optical deinterleaver, and the second band port of the third band separator/combiner device being connected to the second interleave port of the optical interleaver, and the WDM port of the third band separator/combiner device being connected, in case of the first remote node optical interleaver/deinterleaver device, to the first WDM output port of the second cyclic channel multiplexer or, in case of the second remote node optical interleaver/deinterleaver device, to the second WDM output port of the second cyclic channel multiplexer.

According to a further embodiment (claim 11), the central node cyclic multiplexer and band separator/combiner device and the remote node cyclic multiplexer and band separator/combiner device include one or more passive optical cyclic channel multiplexers having a predetermined number of channel ports and two cyclic WDM ports and of one or more optical band separator/combiners having a WDM port and a first band port for receiving or outputting a respective downstream band and a second band port for receiving or outputting a respective upstream band.

The cyclic channel multiplexers are typically realized as cyclic arrayed waveguide gratings having a predetermined number of channel ports and two cyclic WDM ports (claim 12).

The optical band separator/combiners may be realized as 3-port optical band separator/combiners of the following kinds (claim 13):
 a 3-port optical band multiplexer having a common WDM port and two band ports,
 an optical diplexer, or
 a 3-port optical circulator.

According to a typical embodiment (claim 14), the central node, within at least one of the paths of the basic or extension or interleaved downstream WDM working and protection signals, includes a controllable optical amplifier which is controllable by the protection control unit, in particular with respect to its amplification factor. This allows to independently adjust the optical power of the single downstream WDM working and protection signals to the respective transmission links. The amplifiers in the paths for WDM signals in which no signals are transmitted (paths for unused WDM working or protection signals) are typically controlled (by the protection control unit) to remain in a sleep mode or to be completely switched off. As the case may be, the switched off mode may be replaced by a shutter mode in which the optical amplifier completely blocks any transmission in the respective path.

The sleep mode may be realized by controlling the pumping current of an optical pump source of the optical amplifier to be at a threshold value at which the optical pumping power is essentially negligible. This enables to quickly switch the optical amplifier into an active mode in which the gain of the optical amplifiers achieves a desired value.

Correspondingly, the central node may, within at least one of the paths of the basic or extension or interleaved upstream WDM working and protection signals, include a controllable optical amplifier which is controllable by the protection control unit, in particular with respect to its amplification factor. Again, the optical amplifier may also be controlled into a sleep mode or be completely switched off or even be switched into a shutter mode.

Further embodiments of the invention are described herein.

BRIEF DESCRIPTION OF THE DRAWINGS

The foregoing and other objects and advantages of the invention and the manner in which the same are accomplished will become clearer based on the following detailed description taken in conjunction with the accompanying drawings in which.

DETAILED DESCRIPTION

The present invention will now be described more fully hereinafter with reference to the accompanying drawings, in which typical embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
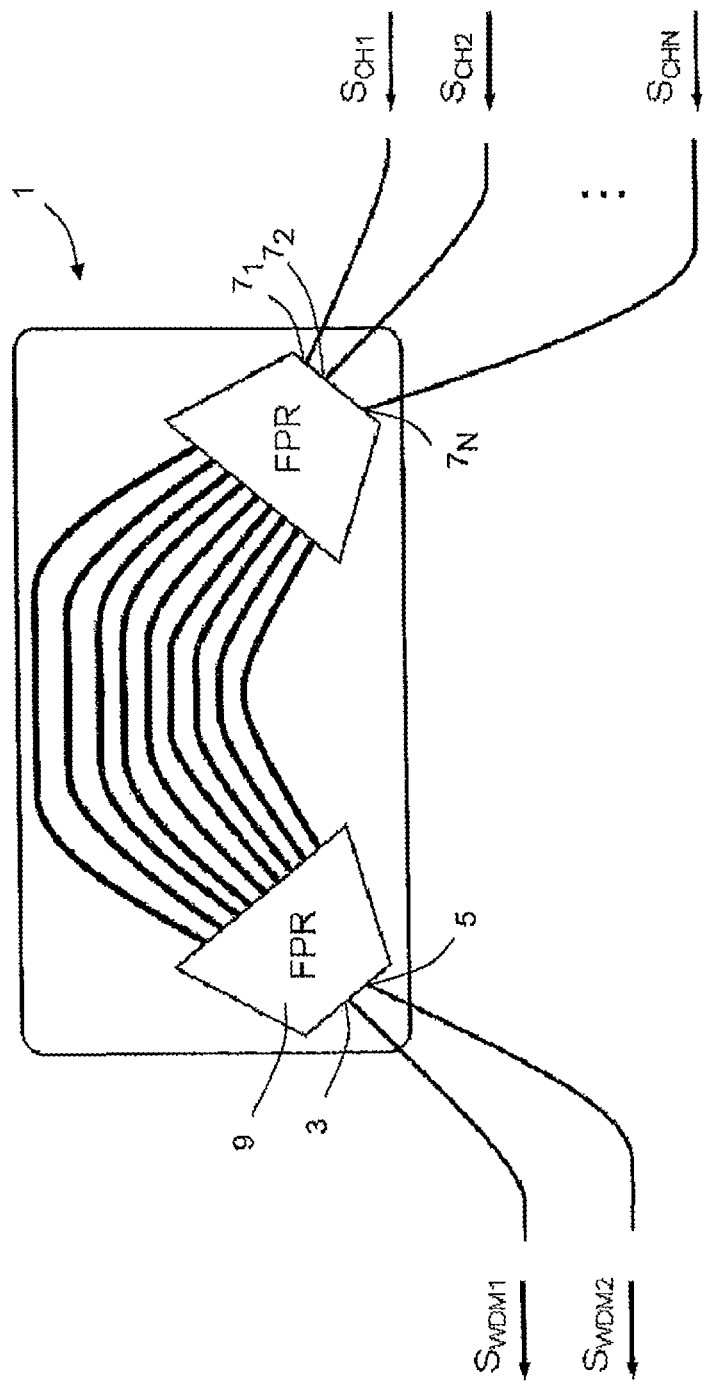
FIG. 1 is a schematic representation of a cyclic arrayed waveguide grating (AWG)

FIG. 1 schematically shows a 2×N-port arrayed waveguide grating 1 having a first and a second WDM port 3, 5 and a given number of N channel ports $7_1$ to $7_N$. The channel ports and WDM ports can be connected to respective optical waveguides, e.g. optical fibers. Due to the physics of a cyclic AWG, a given channel bandwidth is associated with each channel port $7_1$ to $7_N$ so that channel signals $S_{CH1}$ to $S_{CHN}$ fed to the respective channel ports $7_1$ to $7_N$ are combined to a WDM signal $S_{WDM1}$ output at the first WDM port 3, if the channel signals $S_{CH1}$ to $S_{CHN}$ lie within the respective channel bandwidths. The cyclic nature of the AWG 1 results in that, if the channel signals $S_{CH1}$ to $S_{CHN}$ are created at wavelengths lying within the channel bandwidth of the channels number 2 to N+1, the channel signals are combined to a respective WDM signal $S_{WDM2}$ output at the second WDM port 5.

In the same way, a WDM channel signal $S_{WDM1}$ including channel signals lying within the channel bandwidths of the channels number 1 to N which is input at WDM port 3 produces demultiplexed channel signals $S_{CH1}$ to $S_{CHN}$ output at the channel ports $7_1$ to $7_N$. A WDM channel signal $S_{WDM1}$ including channel signals lying within the channel bandwidth of the channels number 2 to N+1 which is input at WDM port 5 also produces demultiplexed channel signals SCH1 to SCHN output at the channel ports $7_1$ to $7_N$, the channel signals $S_{CH1}$ to $S_{CHN}$ having the respective shifted wavelengths.

Thus, shifting the wavelengths of the channel input signals $S_{CH1}$ to $S_{CHN}$ by a channel spacing results in switching from a respective WDM output signal $S_{WDM1}$ output at the first WDM port 3 to a respective WDM output signal $S_{WDM2}$ output at the second WDM port 5.

This behavior is used by the present invention to switch from a working path between a central node and a remote node to a protection path and vice versa.

Of course, the shift required for switching from the first to the second AWG WDM port depends on the AWG design. If two neighboring output ports at the output side of an output free propagating range 9 of the AWG 1 are used as first and second WDM ports 3, 5, the required shift is a single channel spacing. If other output ports are used the required shift is a corresponding integer multiple of the channel spacing. However, this does not influence the above-explained principle. In the following, for simplicity, a shift of a single channel spacing of the wavelengths of the channel input signals shall be assumed to be suitable for switching the WDM output signal to the respective other WDM output port.

Figure 2:
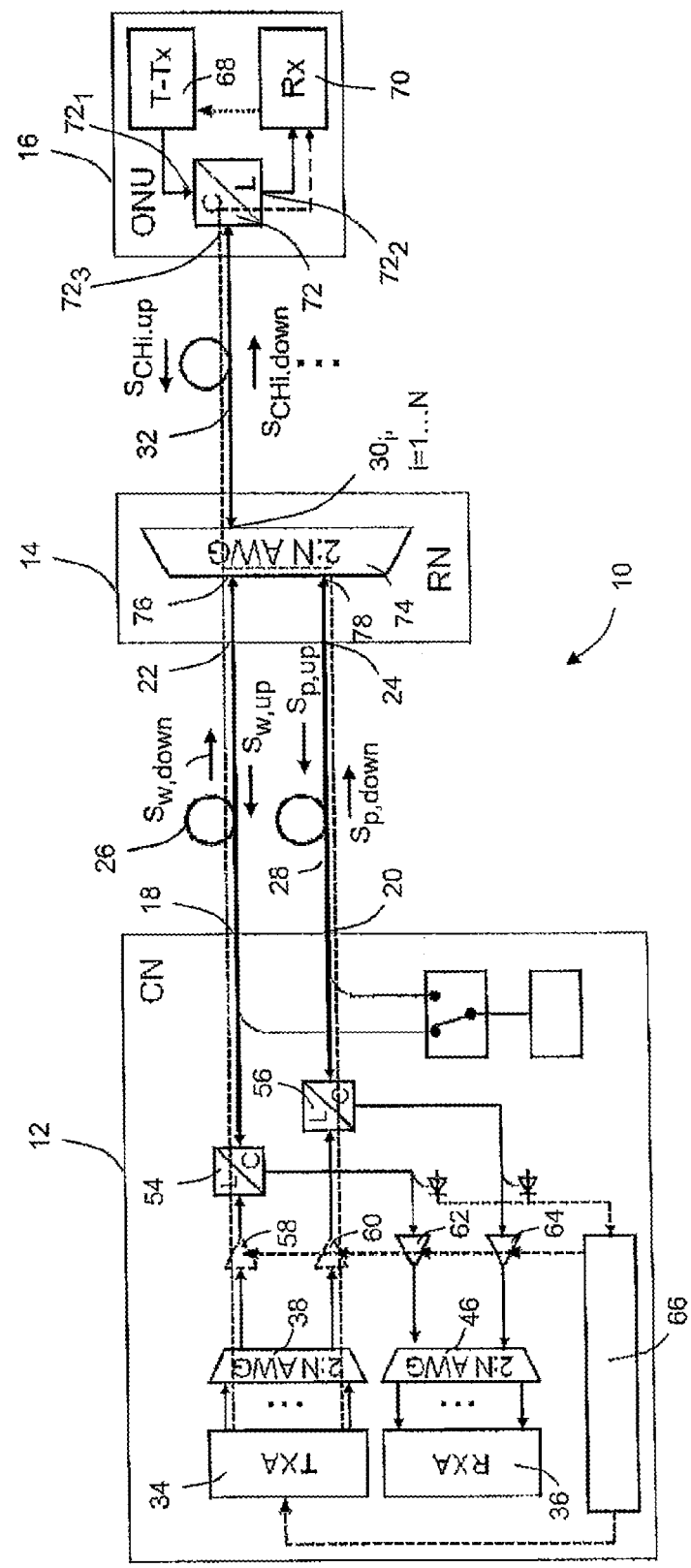
FIG. 2 is a schematic block diagram of a first embodiment of an optical wavelength division multiplex (WDM) transmission system according to the invention using a single basic band for the downstream WDM working and protection signals and a single basic band for the upstream WDM working and protection signals.

FIG. 2 shows a schematic block diagram of an optical WDM transmission system 10 being a WDM-PON including a central node 12, a remote node 14 and a number of N ONUs 16. The central node 12 includes a first WDM port 18 connected to a first WDM port 22 of the remote node 14 via a bidirectional optical working path 26 (generally realized as optical fiber) and a second WDM port 20 connected to a second WDM port 24 of the remote node 14 via a bidirectional optical protection path 28 (generally realized as optical fiber). The remote node 14 includes a number of N channel ports 30, each being connected to a respective ONU 16 via a bidirectional optical ONU path (generally realized as optical fiber).

The central node 12 further includes a plurality of N tunable optical transmitters that may be realized as an array 34 of N optical transmitters, each optical transmitter creating a downstream channel signal $S_{CH1}$ to $S_{CHN}$, and a plurality of N (broadband) optical receivers that may be realized as an array 36 of N optical receivers. A cyclic multiplexer and band separator/combiner device of the central node 12 includes a first cyclic channel multiplexer 38 having N channel ports $40_1$ to $40_N$ and a first and a second WDM port 42, 44, a second cyclic channel multiplexer 46 having N channel ports $48_1$ to $48_N$ and a first and a second WDM port 50, 52, a first band separator/combiner 54 having a first band port $54_1$, a second band port $54_2$ and a WDM port $54_3$, and a second band separator/combiner 56 having a first band port $56_1$, a second band port $56_2$ and a WDM port $56_3$.

The channel ports $40_1$ to $40_N$ of the cyclic channel multiplexer 38 are connected to a respective one of the tunable optical transmitters 34. The channel ports $48_1$ to $48_N$ of the cyclic channel multiplexer 46 are connected to a respective one of the optical receivers 36.

The cyclic channel multiplexers 38, 46 are typically realized as 2×N-port cyclic AWGs and in general function as explained in connection with the cyclic 2×N-port AWG 1 of FIG. 1. The first and second band separator/combiners 54, 56 may be realized as optical diplexers (or optical circulators).

The first band port $54_1$ of the first band separator/combiner 54 is connected to the first WDM port 42 of the cyclic channel multiplexer 38, and the second band port $54_2$ of the first band separator/combiner 54 is connected to the first WDM port 50 of the cyclic channel multiplexer 46. A controllable optical amplifier 58 is provided within the optical path between the first band port $54_1$ of the first band separator/combiner 54 and the first WDM port 42 of the cyclic channel multiplexer 38. A further controllable optical amplifier 62 is provided within the optical path between the second band port $54_2$ of the first band separator/combiner 54 and the first WDM port 50 of the cyclic channel multiplexer 46.

Similarly, the first band port $56_1$ of the second band separator/combiner 56 is connected to the second WDM port $44_2$ of the cyclic channel multiplexer 38, and the second band port $56_2$ of the second band separator/combiner 56 is connected to the second WDM port 52 of the cyclic channel multiplexer 46. A controllable optical amplifier 60 is provided within the optical path between the first band port $56_1$ of the second band separator/combiner 56 and the second WDM port 44 of the cyclic channel multiplexer 38. A further controllable optical amplifier 64 is provided within the optical path between the second band port $56_2$ of the first band separator/combiner 56 and the second WDM port 52 of the cyclic channel multiplexer 46.

The WDM port $54_3$ of the first band separator/combiner 54 is connected to (or defines) the central node first WDM port 18. In the same way, the WDM port $56_3$ of the second band separator/combiner 56 is connected to (or defines) the central node second WDM port 18.

A protection control unit 66 is provided within the central node which controls the wavelengths of the downstream channel signals $S_{CH1}$ to $S_{CHN}$ produced by the N optical transmitters 34 and further controls the optical amplifiers 58, 60, 62, 64 (this is indicated by the dashed lines in FIG. 2).

Each ONU 16 includes a tunable optical transmitter and a (broadband) optical receiver 70 and a band separator/combiner 72 having a first band port $72_1$, a second band port $72_2$ and a WDM port $73_3$. The band port $72_1$ is connected to the optical transmitter 68 and the band port $72_2$ is connected to the optical receiver 70. The WDM port $72_3$ is connected to the respective ONU path 32.

The optical WDM transmission system in FIG. 2 and FIG. 2a operates as follows:

In a working mode, the protection control unit controls the wavelengths of the tunable optical transmitters 34 to be at the values of the downstream channel working wavelengths so that the cyclic channel multiplexer 38 multiplexes the downstream channel signals $S_{CH1,down}$ to $S_{CHN,down}$ (at their working wavelengths) into a downstream WDM working signal $S_{w,down}$. This signal is fed to the band port $54_1$ of the band separator/combiner 54. As indicated in FIG. 2, the working wavelengths of the downstream channel signals may lie within the optical L-band (1565 nm-1625 nm). The band separator/combiner 54 forwards this downstream WDM working signal $S_{w,down}$ via the WDM port $54_3$ to the central node first WDM port 18.

The remote node 14 in FIG. 2 includes a cyclic channel multiplexer 74 which receives the downstream WDM working signal $S_{w,down}$ at a first WDM port 76 being connected to or defining the remote node first WDM port 22. The cyclic channel multiplexer 74 demultiplexes the downstream WDM working signal $S_{w,down}$ into the respective downstream channel signals and feeds it to the respective output port 30. Thus, each ONU 16 receives the dedicated downstream working channel $S_{CHi}$ (i−1 . . . N) at the WDM port $72_3$ of the band separator/combiner 72 which separates L-band and C-band signals and feeds the downstream working channel $S_{CHi}$ to the optical receiver 70.

Similarly, each of the ONUs 16 creates an upstream working channel signal $S_{CH1,up}$ to $S_{CHN,up}$ at respective working wavelengths lying in an upstream wavelength band that does not overlap with the downstream working band. The upstream channel signals may, as indicated in FIG. 2, lie within the optical C-band. The upstream channel signals $S_{CHi,up}$ (i−1 . . . N) are fed to the band port $72_1$ of the ONU band separator/combiner 72 which is adapted to forward the C-band signal to the WDM port $72_3$, only.

Thus, the remote node cyclic channel multiplexer receives the upstream working channel signal $S_{CH1,up}$ to $S_{CHN,up}$ at the channel ports 30 and multiplexes them into an upstream WDM working signal $S_{w,up}$ which is output at the first WDM port 76 of the remote node cyclic channel multiplexer 76 and the remote node first WDM port 22, respectively. Here, the free spectral range of the cyclic channel multiplexer 74 and the upstream channel signal wavelengths are chosen such that the upstream working channel signals are multiplexed into the upstream WDM working signal which is output at the first WDM port 76.

In the central node 12, the upstream WDM working signal $S_{w,up}$ is fed, via the first WDM port 18, to the WDM port $54_3$ of the band separator/combiner 54, which is adapted to forward the C-band signal $S_{w,up}$ to the band port $54_2$, only. The upstream WDM working signal $S_{w,up}$ is then demultiplexed into the respective upstream channel signals $S_{CHi,up}$ by the cyclic channel multiplexer 46, and the demultiplexed upstream channel signals are received by the optical receivers 36.

In case the protection control unit detects, by using a detector 80 (e.g., an optical coupler and an optical detector), that no upstream WDM working signal is present, it concludes that the working path is interrupted and controls the optical transmitters 34 to create the downstream channel signals $S_{CH1,down}$ to $S_{CHN,down}$ at their protection wavelengths. This means, the wavelengths of the downstream channel signals are shifted by the appropriate integer multiple of the channel spacing. As a result, the channel signals $S_{CH1,down}$ to $S_{CHN,d}$ are multiplexed by the cyclic channel multiplexer 38 into a downstream WDM protection signal $S_{p,down}$ which is output at the second WDM port 44 of the cyclic channel multiplexer 38 and supplied to the band port $56_1$ of the band separator/combiner 56.

The band separator/combiner 56 outputs the downstream WDM protection signal $S_{p,down}$ at the WDM port $56_3$ so that the downstream WDM protection signal $S_{p,down}$ is transmitted, via the central node second WDM port 20, to the remote node second WDM port 24 and the second WDM port 78 of the cyclic channel multiplexer 74. The cyclic channel multiplexer 74 demultiplexes the received downstream WDM protection signal into the respective downstream channel signals $S_{CH1,down}$ to $S_{CHN,down}$ (at their protection wavelengths) which are output at the channel ports $30_i$ (i−1 to N) of the cyclic channel multiplexer 74 and received by the respective ONU 16.

In this protection mode, the ONUs create the respective upstream channel signals $S_{CH1,up}$ to $S_{CHN,up}$ at the appropriate protection wavelengths (shifted by the appropriate integer value of the channel spacing). These are received at the channel ports $30_1$ to $30_N$ of the cyclic channel multiplexer 74 of the remote node and multiplexed into an upstream WDM protection signal $S_p$, up which is output at the second WDM port 78 and output from the remote node at the second WDM port 24.

In the central node, the upstream WDM protection signal $S_{p,up}$ is supplied, via the second WDM port 20, to the WDM port 563 of the band separator/combiner 56 which outputs this signal at the band port $56_2$, only. The upstream WDM protection signal $S_{p,up}$ is then supplied to the second WDM port 52 of the cyclic channel multiplexer 46 which outputs the demultiplexed upstream protection channel signals $S_{CH1,up}$ to $S_{CHN,up}$ at the channel port to the optical receivers 36.

In order to minimize noise, the control unit 66 may switch off the optical amplifiers in the respective unused downstream or upstream working or protection paths.

The switching of the ONU transmitters 68 from the working mode to the protection mode and vice versa may be effected by transmitting a respective request from the central node to the ONUs. This may also be effected by the protection control unit which controls the optical transmitters 34 to send a suitable request signal.

A corresponding switching action is effected in case of an active protection mode, if the protection control unit 66 detects, by using a detector 82 (e.g. an optical coupler and an optical detector), that no upstream WDM working signal is present. In this case, the protection control unit concludes that the protection path is interrupted and controls the optical transmitters 34 to create the downstream channel signals $S_{CH1,down}$ to $S_{CHN,down}$ at their working wavelengths. This means, the wavelengths of the downstream channel signals are shifted by the appropriate integer multiple of the channel spacing.

Monitoring or examination of the optical paths reaching from the central node 12 to the ONUs 68 may be realized by coupling a tunable optical time domain reflectometer (tunable OTDR) 84 to the respective optical path within the remote node 12 by using an optical switch 86 and optical couplers 88, 90. The couplers 88, 90 may be realized as optical band multiplexers being able to forward the upstream WDM working or protection signals which lie within the C-band to the ports connected to the WDM ports $54_3$, $56_3$ of the band multiplexers 54, 56 and which forward a backscattered signal lying within the L-band to the respective switched port of the optical switch 86. If a tunable OTDR working with a measuring signal in the C-band is used, the couplers 88, 90 should be wavelength-independent couplers with a low splitting ratio in order to keep the insertion loss as low as possible. Monitoring may be effected for the respective working or protection path 26, 28 and the corresponding ONU path during a phase in which the upstream and downstream signals are transmitted over the respective monitored path. However, it may be typical to switch the switch 86 (manually or controlled by a control means, not shown) to the path which is presently not active before starting the monitoring process. As monitoring of such a WDM-PON is well-known as such, it shall not be discussed here in further detail.

The WDM-PON according to FIG. 2 shall, in the following, be addressed as basic structure and the essential components and signals explained above are, with respect to the following description, designated as "basic" components and signals. This structure may easily be extended with respect to the number of transmission channels and may easily be adjusted to specific further requirement, like the additional transmission of a broadband broadcasting signal from the central node to selected or all ONUs.

Figure 2A:
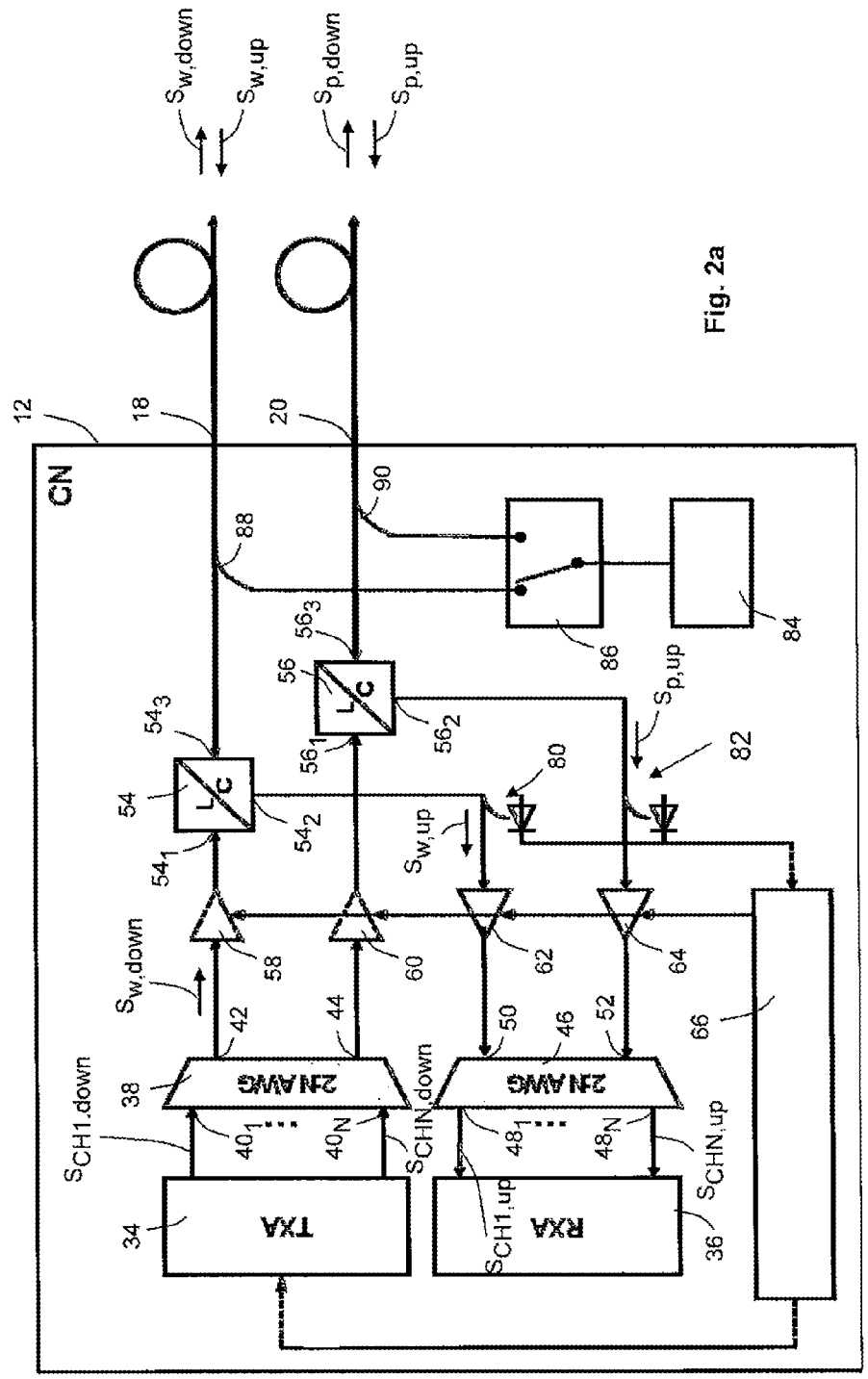
FIG. 2a is an enlarged view of the central node in FIG. 2.
Figure 3:
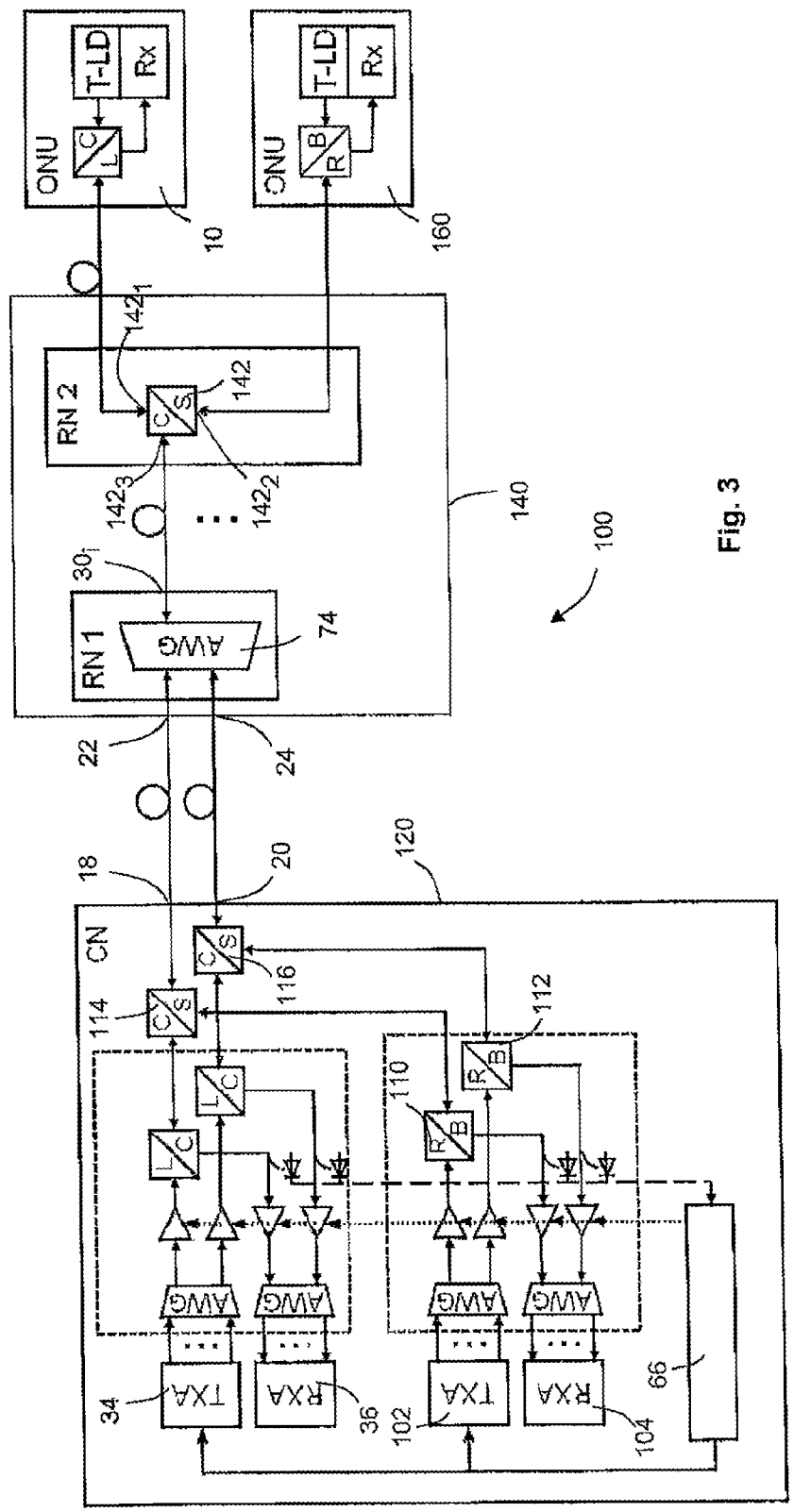
FIG. 3 is a schematic block diagram of a second embodiment of an optical wavelength division multiplex (WDM) transmission system according to the invention using a basic and an extension band for the downstream WDM working and protection signals and a basic and an extension band for the upstream WDM working and protection signals.
Figure 3A:
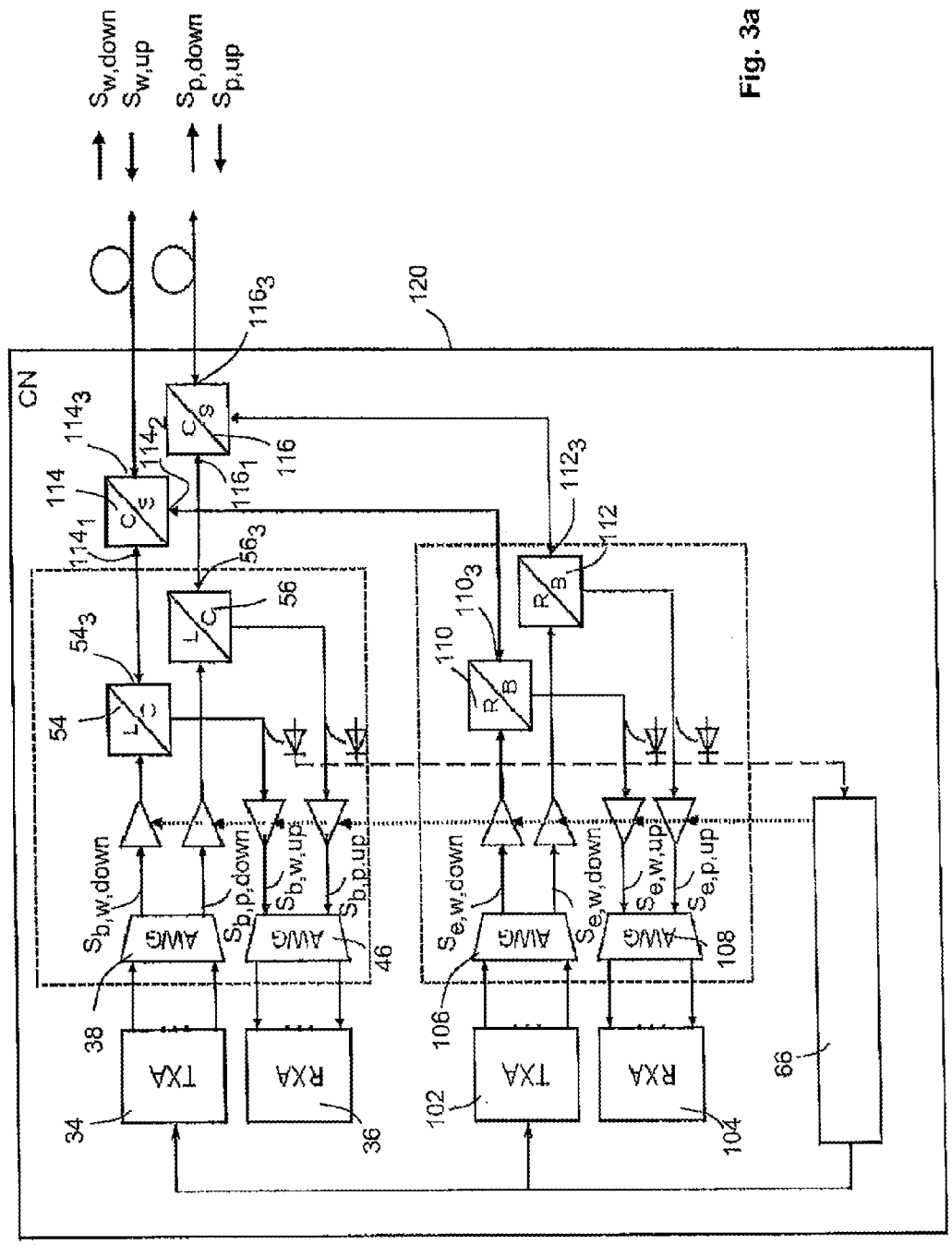
FIG. 3a is an enlarged view of the central node in FIG. 3.

FIG. 3 shows a schematic block diagram of a WDM transmission system 100 which is an extended version of the basic structure shown in FIGS. 2 and 2a adapted to transmit signals in further transmission channels. As indicated in FIG. 3, the additional transmission channels lie within a further band, namely, the optical S-band (1460 nm to 1530 nm) which may be divided into a lower sub-band B (for blue) and R (for red).

The central node 120 of this system 100 includes all elements of the central node 12 of the system 10 shown in FIGS. 2 and 2a. These are designated by identical reference numerals. In addition, the central node 120 practically includes an almost complete second central node of the type as shown in FIGS. 2 and 2a. Of course, the protection control unit 66 of the central node in FIG. 3 controls all required functions of the node.

The central node 120 includes a further group of extension optical transmitters 102 transmitting at respective extension wavelengths in the B-band. Of course, the protection control unit 66 controls the transmitters 102 in the same way as the basic transmitters 34 in order to produce these extension downstream optical signals $S_{eCH1}$ to $S_{eCHN}$ at respective working and protection wavelengths. As it is advantageous with respect to the demultiplexing of the signals in the remote node 140 to produce these extension signals at wavelengths being separated from the basic channel signals by an integer multiple of the free spectral range of the respective cyclic multiplexer (used in the remote node 140) the additional cyclic channel multiplexers 106, 108 for multiplexing the extension downstream optical signals $S_{eCH1}$ to $S_{eCHN}$ into an extension downstream WDM working signal $S_{e,w,down}$ or into an extension downstream WDM protection signal $S_{e,p,down}$ and demultiplexing an extension upstream WDM working signal $S_{e,w,up}$ or an extension upstream WDM protection signal $S_{e,p,up}$ created in the remote node 140 may be identically designed as the respective basic cyclic channel multiplexers 38, 46. As with the basic components, the extension components includes a group of extension optical receivers 104 which may be realized as an array of optical receivers.

The extension components further include two extension band separator/combiners 110, 112 acting in accordance with to the basic band separator/combiners 54, 56, but perform their function in the R-band and B-band.

The first and second WDM port 18, 20 of the central node is connected to WDM ports 114$_3$ and 116$_3$ of further band separator/combiners 114 and 116, for separating/combining signals in the C- and L-band from/with signals in the R- and B-band. As the "separation border" is between the R-sub-band of the S-band and the C-band (the L-band is above the wavelengths of the C-band) these components are labeled with "C/S" for reasons of simplicity. The first band port 114$_1$ of the band separator/combiner 114 is connected to the WDM port 54$_3$ of the basic band separator/combiner 54. The first band port 116$_1$ of the band separator/combiner 116 is connected to the WDM port 56$_3$ of the basic band separator/combiner 56. The second band port 114$_2$ of the band separator/combiner 114 is connected to the WDM port 110$_3$ of the extension band separator/combiner 110, and the second band port 116$_2$ of the band separator/combiner 116 is connected to the WDM port 112$_3$ of the extension band separator/combiner 112.

In this way, the band separator/combiner 114 serves to combine the basic downstream WDM working signal $S_{b,w,down}$ and the extension downstream WDM working signal $S_{e,w,down}$ into a combined downstream WDM working signal $S_{w,down}$, output at the WDM port 114$_3$, including the basic downstream channel signals and the extension downstream channel signals at their working wavelengths. Further, the band separator/combiner 114 serves to separate a received combined upstream WDM working signal $S_{w,up}$ into a basic upstream WDM working signal $S_{b,w,up}$ output at the first band port 114$_1$ and into an extension upstream WDM working signal $S_{e,w,up}$ output at the second band port 114$_2$.

Similarly, the band separator/combiner 116 serves to combine the basic downstream WDM protection signal $S_{b,p,down}$ and the extension downstream WDM protection signal $S_{e,p,down}$ into a combined downstream WDM protection signal $S_{p,down}$ output at the WDM port 116$_3$, including the basic downstream channel signals and the extension downstream channel signals at their protection wavelengths. Further, the band separator/combiner 116 serves for separating a received combined upstream WDM protection signal $S_{p,up}$ into a basic upstream WDM protection signal $S_{b,p,up}$ output at the first band port 116$_1$ and into an extension upstream WDM protection signal $S_{e,p,up}$ output at the second band port 116$_2$.

The combined upstream WDM working signal $S_{w,up}$ and the combined upstream WDM protection signal $S_{p,up}$ are created in the extended remote node 140 including a cyclic channel multiplexer which may have an identical design as the basic cyclic channel multiplexer 74 in the remote node 14 of FIG. 2. Thus, the cyclic channel multiplexer in the remote node 140 is also designated by the reference numeral 74. The free spectral range property of the cyclic channel multiplexer 74 is used in order to process the signals lying in the four bands (L-, C-, R-, B-band). In the extended node 140 each of the cyclic channel multiplexer 74 channel ports 30$_i$ (i–1 ... N) is connected to a WDM port 142$_3$ of a band separator/combiner 142 for separating/combining signals in the B- and R- and in the C- and L-bands.

As the optical downstream signal in the optical paths between each channel port 30$_i$ of the cyclic channel multiplexer includes two channel signals, one in the L-band and one in the R-band, these two downstream channel signals are separated by the band separator/combiner 142, the basic channel signal in the L-band being output at the first band port 142$_1$ and supplied to the respective basic ONUs 10, and the extension channel signal in the R-band being output at the second band port 142$_2$ and supplied to a respective extension ONU 160. The ONUs reveal an identical structure (each including a full-range tunable transmitter and a broadband receiver), however, the extension ONUs are designed to function in the S-band rather than in the L- and C-band. Thus, the extension ONUs include a band separator/combiner for separating/combining signals in the R- and B-band.

In the upstream direction, the pairs of channel signals of respective ONUs 10, 160 are combined by the band separator/combiners 142 and transmitted to the dedicated channel port 30$_i$ of the cyclic channel multiplexer 74 which creates the combined upstream WDM working signal $S_{w,up}$ (in the working mode) or the combined upstream WDM protection signal $S_{p,up}$ (in the protection mode).

This architecture of the remote node 140 is especially suitable for supplying pairs of neighboring ONUS. The ONU 140 may be a decentralized ONU with the cyclic channel multiplexer and the number of N band separator/combiners 142 being located at distributed locations.

Figure 4:
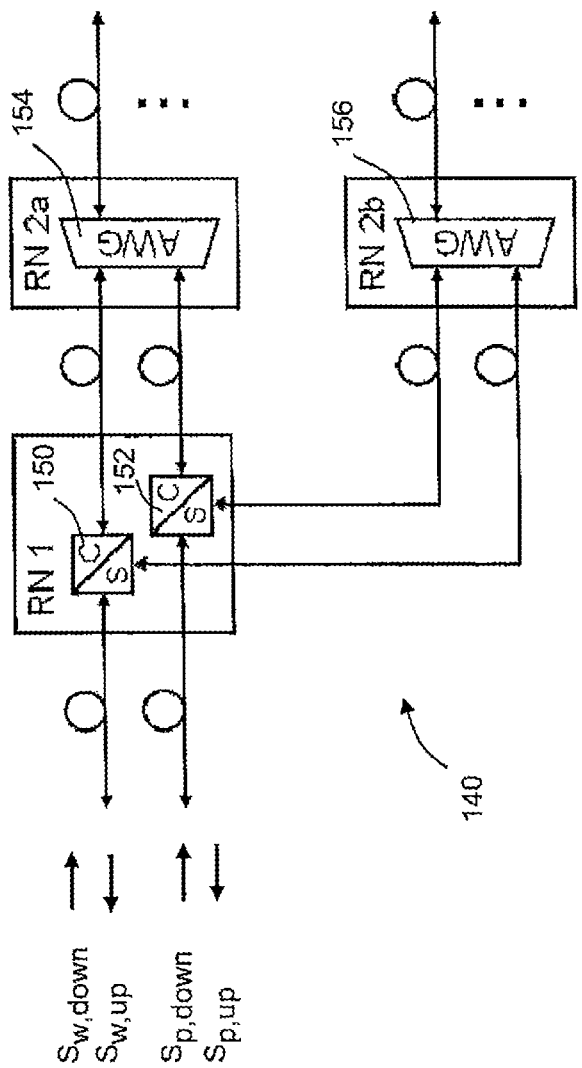
FIG. 4 is a schematic block diagram for an alternative structure of the remote node of the embodiment according to FIG. 3.

If two groups of ONUS are to be connected to a central node which are spaced apart whereas the ONUS within each group are located to be rather close to each other, the architecture according to FIG. 4 is advantageous. In this case, the remote node 140 includes a first and a second band separator/combiner 150, 152 for separating/combining signals lying in the B- and R-band, which are supplied to a first and a second WDM port of a first cyclic channel multiplexer 154, and in signals lying in the C- and L-band, which are fed to a first and a second WDM port of a second cyclic channel multiplexer 156. Thus, the first cyclic channel multiplexer 154 receives the basic downstream WDM working signal $S_{b,w,down}$ and the basic downstream WDM protection signal $S_{b,p,down}$, whereas the second cyclic channel multiplexer 156 receives the extension downstream WDM working signal $S_{e,w,down}$ and the extension downstream WDM protection signal $S_{e,p,down}$. These multiplex signals are demultiplexed by the cyclic channel multiplexers and output at the respective channel ports, each channel port of the cyclic channel multiplexer 154 being connected to a basic ONU 10 (FIG. 3) for signals in the C- and L-band and each channel port of the cyclic channel multiplexer 156 being connected to an extension ONU 160 (FIG. 3) for signals in the B- and R-band.

Figure 5:
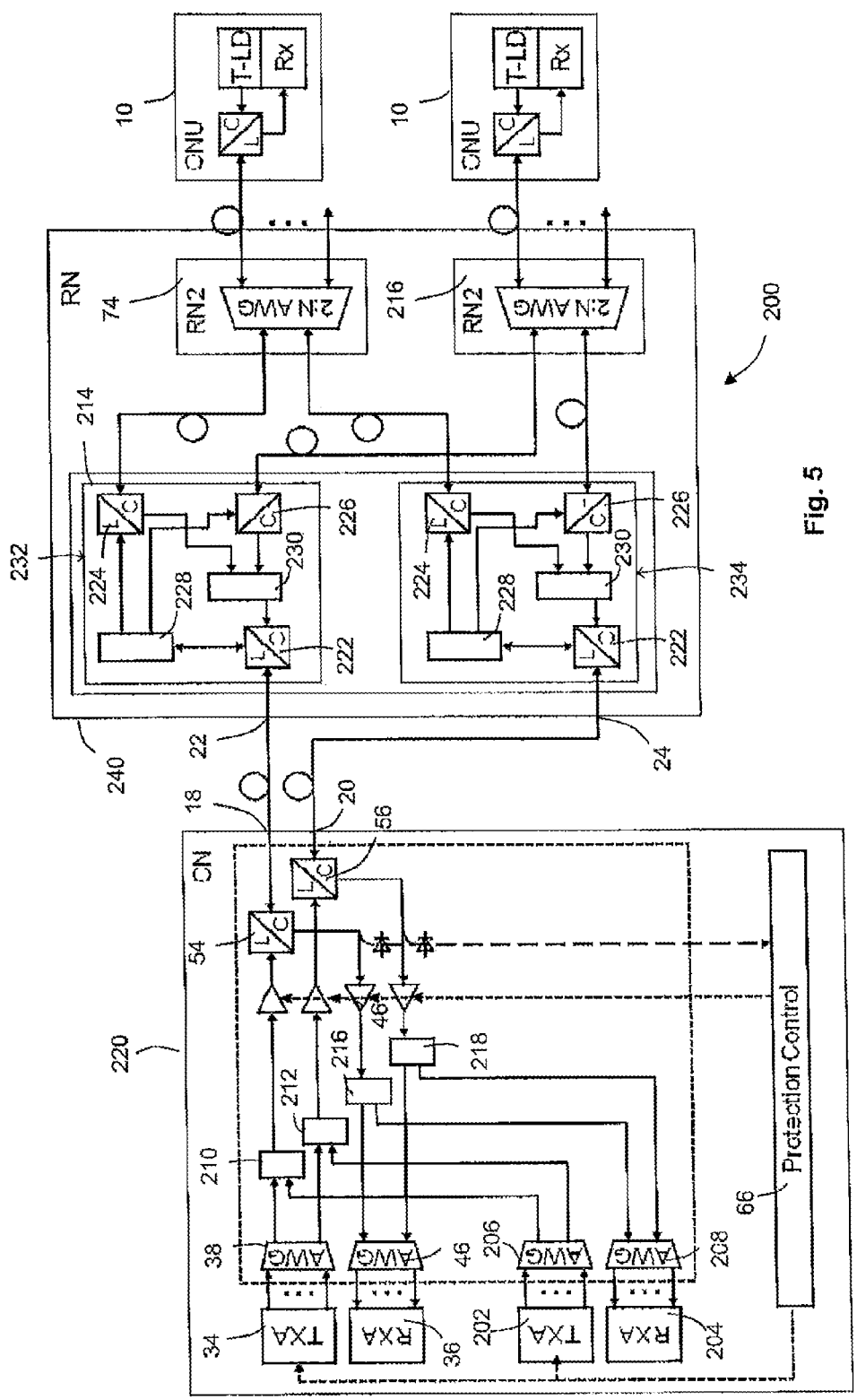
FIG. 5 is a schematic block diagram of a third embodiment of an optical wavelength division multiplex (WDM) transmission system according to the invention using a single basic band for the downstream WDM working and protection signals and a single basic band for the upstream WDM working and protection signals, the basic and extension channel signals being interleaved channel signals.

FIG. 5 shows a further alternative to extend the system architecture shown in FIGS. 2 and 2a with respect to the number of channels and, therefore, with respect to the number of ONUs which may be connected to the central node.

Instead of using an additional wavelength band, the embodiment according to FIG. 5 increases the density of the channels within the respective band. Although the embodiment according to FIG. 5 uses a single downstream band (L-band) and a single upstream band (C-band), the principle may of course also be applied to an architecture using more bands, like the embodiment of FIG. 3.

The central node 220 includes all basic components of the central node in FIG. 2 which are designated by identical reference numerals.

In addition to the group of basic optical transmitters 34 and the group of basic optical receivers 36, the central node includes a group of extension optical transmitters 202 and a group of extension optical receivers 204. Further, the central node includes a first extension cyclic channel multiplexer 206 for multiplexing the channel signals created by the extension transmitters 202 and a second extension cyclic channel multiplexer 208 for demultiplexing the extension upstream WDM working signal $S_{e,w,up}$ and the extension upstream WDM protection signal $S_{e,p,up}$ and for feeding the demultiplexed channel signals to the extension receivers 204.

The wavelengths of the extension transmitters and the channels defined by the extension cyclic multiplexers 206, 206 are in an interleaving position with respect to the wavelengths and channels of the basic transmitters 34 and the basic cyclic channel multiplexers 38, 46. It is therefore possible to combine the basic downstream working channel signals with the extension downstream working channel signals and the basic downstream protection channel signals with the extension downstream protection channel signals to an interleaved downstream WDM working signal and an interleaved downstream WDM protection signal, respectively. The extension channels may have the same channel spacing as the basic channels, but are shifted in their spectral position by a given value, typically by half a channel spacing of the basic channels. This interleaving is effected by interleavers 210 and 212, respectively.

This interleaved downstream WDM working signal $S_{w,down}$ and this interleaved downstream WDM protection signal $S_{p,down}$ are output at the central node first and second WDM port 18, 20 and supplied to the remote node first and second WDM ports 22, 24.

The remote node 240 includes an interleaver structure 214 having two WDM ports which are connected to or define the first and second remote node first and second WDM ports 22, 24, respectively. The interleaver structure 214 is designed for de-interleaving the received interleaved WDM working signal $S_{w,down}$ and supplying the de-interleaved basic downstream WDM working signal $S_{b,w,down}$ to the basic cyclic channel multiplexer 74 and supplying the de-interleaved extension downstream WDM working signal $S_{e,w,down}$ to an extension cyclic channel multiplexer 216 and for de-interleaving the received interleaved WDM protection signal $S_{p,down}$ and supplying the de-interleaved basic downstream WDM protection signal $S_{b,p,down}$ to the basic cyclic channel multiplexer 74 and supplying the de-interleaved extension downstream WDM protection signal $S_{e,p,down}$ to the extension cyclic channel multiplexer 216. The cyclic channel multiplexers 74, 216 demultiplex the received signals into the respective basic and extension downstream channel signals which are supplied to the dedicated ONUs coupled to the channel ports.

Similarly, the basic ONUs create the respective basic and extension upstream channel signals which lie within the same band (here, the C-band) and which are multiplexed by the respective basic or extension cyclic multiplexer 74, 216 into the respective basic and extension upstream WDM working signals $S_{e,w,up}$, $S_{b,w,up}$ or into the respective basic and extension upstream WDM protection signals $S_{e,p,up}$, $S_{b,p,up}$. These signals are then combined in an interleaving manner by the interleaver structure 214 into the upstream signals $S_{w,up}$ and $S_{p,up}$. The interleaver structure 214 supplies the interleaved upstream signals $S_{w,down}$ and $S_{p,down}$ to the respective first or second remote node WDM port 22, 24.

Within the central node, the upstream signals $S_{w,up}$ and $S_{p,up}$ are directed to a respective one of two further interleavers 216, 218 by using the band separators/combiners 54, 56. The interleaver 216 de-interleaves the upstream signal $S_{w,up}$ into the extension and basic upstream signals $S_{e,w,up}$ and $S_{b,w,up}$ which are supplied to the respective first WDM ports of the extension cyclic multiplexers 206 and 208. In the same way, the interleaver 218 de-interleaves the upstream signal $S_{p,up}$ into the extension and basic upstream signals $S_{e,p,up}$ and $S_{b,w,up}$ which are supplied to the respective second WDM ports of the extension cyclic multiplexers 206 and 208.

Figure 5A:
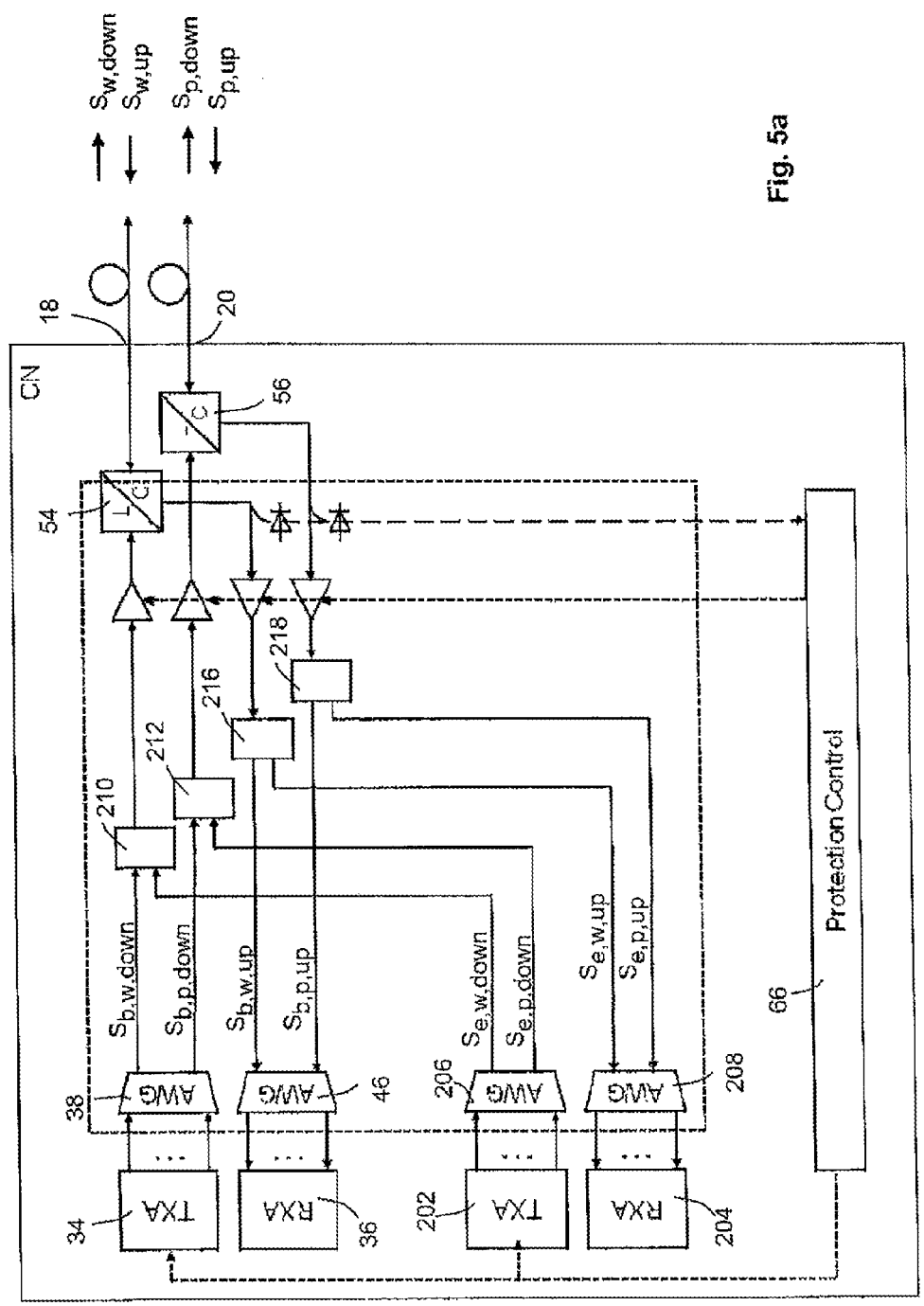
FIG. 5a is an enlarged view of the central node in FIG. 5.

In the embodiment shown in FIGS. 5 and 5a, it is advantageous, as is for all other embodiments, to provide the optical amplifiers within the paths of the combined signals $S_{w,down}$, $S_{p,down}$ and $S_{w,up}$, $S_{p,up}$. As already explained above, the amplifiers controlled by the protection control unit are typically deactivated (switched off, switched into a sleep mode or switched into a shutter mode) when the respective working or protection path is inactive.

The extension cyclic multiplexers 206, 208 and 216 in the central node and remote node may, as mentioned above, define exact narrow-band interleaved channels which are offset by e.g. half a channel spacing versus the channels defined by the basic cyclic multiplexers. Alternatively, these cyclic multiplexers may define channels having a broader bandwidth suitable to transmit (i.e. multiplex/demultiplex) the respective basic channel signal and the respective extension channel signal as the interleaving or de-interleaving is effected by further components.

The interleaver structure 214 shown in FIG. 5 includes two identical interleaver sub-structures 232, 234 for the working signals and the protection signals. Each of the sub-structures 232, 234 include a first, second and third band separator/combiner 222, 224, 226 and a first and second interleaver 228, 230.

In the following, only the function of the sub-structure 232 which processes the signals in the working path will be discussed:

The first band separator/combiner 222 receives, at a WDM port, the interleaved downstream WDM working signal $S_{w,down}$ and outputs this signal at a first band port, only. This signal is supplied to the first interleaver 228 which de-interleaves the signal into the basic and extension downstream WDM working signals $S_{b,w,down}$ and $S_{e,w,down}$. The basic downstream WDM working signal $S_{b,w,down}$ is supplied to a first band port of the second band separator/combiner which outputs this downstream signal at a WDM port being connected to the first WDM port of the basic cyclic multiplexer 74. The further processing of this signal has already been explained above.

The extension downstream WDM working signal $S_{e,w,down}$ output by the interleaver 228 is fed to a first band port of the third band separator/combiner 226 which outputs this signal at a WDM port being connected to the first WDM port of the extension cyclic multiplexer 216. The further processing of this signal has already been explained above.

In the upstream direction, the WDM port of the second band separator combiner 224 receives the basic upstream WDM working signal $S_{b,w,up}$ which is output at the first WDM port of the basic cyclic multiplexer 74. This signal which lies within the C-band is output at a second band port of the second band separator combiner 224 which is connected to an interleaver port of the second interleaver 230. At its second interleaver port, the second interleaver 230 receives the extension upstream WDM working signal $S_{e,w,up}$. This signal is supplied from the first WDM port of the extension cyclic multiplexer 216 to the WDM port of the third band separator/combiner 226 which outputs the signal at its second band port. The second interleaver 230 supplies the interleaved signal to the second band port of the first band separator/combiner 222 which outputs the signal at its WDM port.

As shown above, the basic structure shown in FIGS. 2 and 2a can easily be extended by adding further transmission bands and/or adding interleaved signals in the same band.

Adding a further band may also be used to implement a broadcast function to the system. For example, in case of the structure according to FIG. 3, two further band separators/combiners (one in the path of the basic downstream WDM working signal and a second in the path of the basic downstream WDM protection signal) could be used to add a broadband broadcasting signal (e.g., a TV signal) to the respective WDM signal.

Due to the cyclic nature of the cyclic multiplexers used, especially in the remote node, the broadband broadcasting signal is filtered in the remote node by the filtering function of the respective cyclic multiplexer so that each downstream channel signal supplied to an ONU includes the dedicated downstream channel signal of the point-to-point link which lies in a first band (e.g., the L-band) and a broadcast signal (having a spectrum according to the filtering function of the respective cyclic multiplexer in the respective band region). Thus, simply adding a further band separator/combiner at the input port of the ONU structures shown in the FIGS. 2, 3 and 5, which separates the broadcast signal from the downstream point-to-point signal and which transmits the upstream point-to-point signal to the ONU output port, is sufficient to implement the broadcast signal receiving function.

It is, of course, also possible to extend the basic structure according to FIG. 2 by replacing the dedicated channel signals by a respective time-division-multiplex (TDM) signal and to extend the remote (or each or selected ONUS) node by adding a TDM demultiplexer so that either a number of additional ONUS can be attached to the remote node or the respective ONU is assigned a number of TDM channel signals included in the TDM signal.

LIST OF REFERENCE SYMBOLS 1 2×N-port arrayed waveguide grating
3 first WDM port
5 second WDM port
7 channel ports ($7_1$ to $7_N$)
10 optical WDM transmission system
12 central node
14 remote node
16 ONU
18,20 first and second WDM port of the central node
22,24 first and second WDM port of the remote node
26 bidirectional optical working path (working fiber)
28 bidirectional optical protection path (working fiber)
30 channel port of the remote node
32 bidirectional optical ONU path
34 array of N tunable optical transmitters
36 array of N (broadband) optical receivers
38 first cyclic channel multiplexer
$40_i$ channel ports $40_1$ to $40_N$
42 first WDM port of 38
44 second WDM port of 38
46 second cyclic channel multiplexer
$48_i$ channel ports $48_1$ to $48_N$
50 first WDM port of 46
52 second WDM port of 46
54 first band separator/combiner 54
$54_1$ first band port
$54_2$ a second band port
$54_3$ WDM port
56 second band separator/combiner 56
$56_1$ first band port
$56_2$ a second band port
$56_3$ WDM port
58 controllable optical amplifier
60 controllable optical amplifier
62 controllable optical amplifier
64 controllable optical amplifier
66 protection control unit
68 optical tunable transmitter (ONU)
70 optical receiver (ONU)
72 band separator/combiner (ONU)
$72_1$ first band port
$72_2$ second band port
$72_3$ WDM port
74 cyclic channel multiplexer (remote node)
76 first WDM port of 74
78 second WDM port of 74
80 detector (working signal)
82 detector (protection signal)
84 tunable OTDR
86 optical switch
88 coupler (working path)
90 coupler (protection path)
100 system (FIG. 3)
102 extension optical transmitters
104 extension optical receivers
106 extension cyclic channel multiplexer
108 extension cyclic channel multiplexer
110 extension band separator/combiner (R/B-band, working path)
112 extension band separator/combiner (R/B-band, protection path)
114 band separator/combiner (C/S-band, working path)
$114_1$ first band port
$114_2$ second band port
$114_3$ WDM port
116 band separator/combiner (C/S-band, protection path)
$116_1$ first band port
$116_2$ second band port
$116_3$ WDM port
120 central node
140 remote node
142 band separator/combiner (remote node)
$142_1$ first band port
$142_2$ second band port
$142_3$ WDM port
150 band separator/combiner (ONU, working path)
152 band separator/combiner (ONU, protection path)
154 cyclic channel multiplexer (ONU)

156 cyclic channel multiplexer (ONU)
160 extension ONU
200 system (FIG. 5)
202 extension optical transmitters
204 extension optical receivers
206 extension cyclic channel multiplexer
208 extension cyclic channel multiplexer
210 interleaver
212 interleaver
214 interleaver structure
216 interleaver
218 interleaver
220 central node
222 band separator combiner (interleaver structure)
224 band separator combiner (interleaver structure)
226 band separator combiner (interleaver structure)
228 first interleaver (interleaver structure)
230 second interleaver (interleaver structure)
232 first interleaver sub-structure
234 second interleaver sub-structure
240 remote node

LIST OF SIGNALS $S_{CH1}$ to $S_{CHN}$ channel signals fed to channel ports $7_1$ to $7_N$
$S_{WDM1}$ WDM signal
$S_{WDM2}$ WDM signal
$S_{CH1,down}$ to $S_{CHN,down}$ downstream channel signal
$S_{CH1,up}$ to $S_{CHN,up}$ upstream channel signal
$S_{w,down}$ downstream WDM working signal
$S_{w,up}$ upstream WDM working signal
$S_{p,down}$ downstream WDM protection signal
$S_{p,up}$ upstream WDM protection signal
$S_{e,w,down}$ extension downstream WDM working signal
$S_{e,w,up}$ extension upstream WDM working signal
$S_{e,p,down}$ extension downstream WDM protection signal
$S_{e,p,up}$ extension upstream WDM protection signal
$S_{b,w,down}$ basic downstream WDM working signal
$S_{b,w,up}$ basic upstream WDM working signal
$S_{b,p,down}$ basic downstream WDM protection signal
$S_{b,p,up}$ basic upstream WDM protection signal

The invention claimed is:

1. An optical wavelength division multiplex (WDM) transmission system, especially a WDM passive optical network, comprising:

a central node having (i) a first WDM port and (ii) a second WDM port and a remote node having (i) a first WDM port, (ii) a second WDM port, and (iii) a plurality of channel ports, the central node first WDM port being connected to the remote node first WDM port via a bidirectional single-fiber optical working path, and the central node second WDM port being connected to the remote node second WDM port via a single-fiber bidirectional optical protection path;

a group of basic optical node units (ONU's), each of which is connected to a respective remote node channel port via a bidirectional optical ONU path, each ONU comprising an optical receiver for receiving a basic downstream optical channel signal and an optical tunable transmitter for creating a basic upstream channel signal, each of the basic upstream channel signals, during a working mode of the tunable optical transmitters, being created at a basic upstream channel working wavelength and each of the basic upstream channel signals, during a protection mode of the tunable optical transmitters, being created at a basic upstream channel protection wavelength, all basic upstream channel working wavelengths and all basic upstream channel protection wavelengths lying within a basic upstream wavelength band, each ONU comprising a band multiplexer for separating and combining the basic upstream and downstream signals, each band multiplexer comprising a WDM output port connected to the bidirectional ONU path;

the central node comprising (i) a group of basic tunable optical transmitters, (ii) a group of basic optical receivers, and (iii) a basic cyclic multiplexer and band separator/combiner device defining the bandwidth and spectral position of basic downstream and upstream channels:

the group of basic tunable optical transmitters creating a group of basic downstream channel signals, each of the basic downstream channel signals, during a working mode of the tunable optical transmitters, being created at a basic downstream channel working wavelength, and each of the basic downstream channel signals, during a protection mode of the tunable optical transmitters, being created at a basic downstream channel protection wavelength, all basic downstream channel working wavelengths and all basic downstream channel protection wavelengths lying within a basic downstream wavelength band, which does not overlap with the basic upstream wavelength band;

the group of basic optical receivers receiving a group of basic upstream channel signals;

the basic cyclic multiplexer and band separator/combiner device receiving each of the basic downstream channel signals and multiplexing the basic downstream channel signals, if created at the basic downstream channel working wavelengths, into a basic downstream WDM working signal and outputting the basic downstream WDM working signal at the central node first WDM port, and multiplexing the basic downstream channel signals, if created at the basic downstream channel protection wavelengths, into a basic downstream WDM protection signal, and outputting the basic downstream WDM protection signal at the central node second WDM port; and the basic cyclic multiplexer and band separator/combiner device receiving a basic upstream WDM working signal at the central node first WDM port or a basic upstream WDM protection signal at the central node second WDM port and demultiplexing the basic WDM working signal or the basic WDM protection signal into the basic upstream channel signals; and a protection control unit for detecting a failure within the working path or within the working path and the protection path and for switching the central node tunable optical transmitters and the ONU tunable optical transmitters from the present working or protection mode to the respective other mode;

wherein the basic cyclic multiplexer and band separator/combiner device comprises a first cyclic channel multiplexer having a given number of channel ports and a first and a second cyclic WDM port, the channel ports being connected to the group of basic optical tunable transmitters, the first cyclic channel multiplexer being adapted to multiplex the basic downstream channel signals, if created at the downstream channel working wavelengths, into the basic downstream WDM working signal and to output the basic downstream WDM working signal at a first cyclic WDM port, and to multiplex the basic downstream channel signals, if created at the basic downstream channel protection wavelengths, into the basic downstream WDM protection signal, and to output the basic downstream WDM protection signal at the second cyclic WDM port, and wherein the basic cyclic multiplexer and band separator/combiner device comprises a second cyclic channel multiplexer having a given number of channel ports and a first and a second cyclic WDM port, the channel ports being connected to the group of basic optical receivers and the first and second cyclic WDM port receiving the basic upstream WDM working signal and the basic upstream WDM protection signal, respectively.

2. An optical WDM transmission system according to claim 1, wherein the remote node comprises a cyclic channel multiplexer defining basic upstream and downstream channels identical to the basic upstream and downstream channels defined by the basic cyclic multiplexer and band separator/combiner device of the central node, the cyclic channel multiplexer having a free spectral range being defined so that the optical frequency difference of corresponding basic downstream and upstream channel signals is an integer multiple of the free spectral range of the basic cyclic channel multiplexer, the cyclic channel multiplexer:

receiving the basic upstream channel signals at the remote node channel ports and multiplexing the basic upstream channel signals, if created at the basic upstream channel working wavelengths, into a basic upstream WDM working signal and for outputting the basic upstream WDM working signal at the remote node first WDM port, and multiplexing the basic upstream channel signals, if created at the basic upstream channel protection wavelengths, into a basic upstream WDM protection signal, and outputting the basic upstream WDM protection signal at the remote node second WDM port; and receiving the basic downstream WDM working signal at the remote node first WDM port or a basic downstream WDM protection signal at the remote node second WDM port and demultiplexing the basic WDM working signal or the basic WDM protection signal into the basic downstream channel signals and for feeding each of the basic upstream channel signals to the remote node channel ports.

3. An optical WDM transmission system according to claim 1, wherein the central node basic cyclic multiplexer and band separator/combiner device comprises:

a first optical band separator/combiner for receiving, at a first band port, the basic downstream WDM working signal from the first cyclic WDM port of the first cyclic channel multiplexer and outputting the basic downstream WDM working signal at a WDM port, only, and for receiving, at the WDM port, the basic upstream WDM working signal and outputting the basic upstream WDM working signal at a second band port, only, the second band port being connected to the first cyclic WDM port of the second cyclic channel multiplexer; and a second optical band separator/combiner for receiving, at a first band port, the basic downstream WDM protection signal from the second cyclic WDM port of the first cyclic channel multiplexer and outputting the basic downstream WDM working signal at a WDM port, only, and for receiving, at the WDM port, the basic upstream WDM protection signal and outputting the basic upstream WDM protection signal at a second band port, only, the second band port being connected to the second cyclic WDM port of the second cyclic channel multiplexer.

4. An optical WDM transmission system according to claim 1, wherein the central node further comprises:

a group of extension tunable optical transmitters for creating a group of extension downstream channel signals, the extension downstream channel signals having extension downstream channel working and protection wavelengths lying within an extension downstream wavelength band;

a group of extension optical receivers for receiving a group of extension upstream channel signals created by a group of extension ONUs, the extension upstream channel signals having extension upstream channel working and protection wavelengths lying within an extension upstream wavelength band, the extension downstream and upstream wavelength bands not overlapping with each other and lying above or below the basic downstream and upstream wavelength bands;

an extension cyclic multiplexer and band separator/combiner device:

for receiving the extension downstream channel signals and for multiplexing the extension downstream channel signals, if created at the extension downstream channel working wavelengths, into an extension downstream WDM working signal, and for multiplexing the extension downstream channel signals, if created at the extension downstream channel protection wavelengths, into an extension downstream WDM protection signal; and for receiving an extension upstream WDM working signal or an extension upstream WDM protection signal and for demultiplexing the extension WDM working signal or the extension WDM protection signal into the extension upstream channel signals;

a band separator/combiner for receiving, at a WDM port, the upstream WDM working signal including the basic and extension upstream channel signals from the central node first WDM port and for outputting, at a first band port, the basic upstream WDM working signal and, at a second band port, the extension upstream WDM working signal, and for receiving, at the first band port, the basic downstream WDM working signal, and, at the second band port, the extension downstream WDM working signal, and for outputting, at the WDM port, the basic and extension downstream channel signals, to the central node first WDM port; and a band separator/combiner for receiving, at a WDM port, the upstream WDM protection signal including the basic and extension upstream channel signals from the central node second WDM port and for outputting, at a first band port, the basic upstream WDM protection signal and, at a second band port, the extension upstream WDM protection signal, and for receiving, at the first band port, the basic downstream WDM protection signal, and, at the second band port, the extension downstream WDM protection signal, and for outputting, at the WDM port, the basic and extension downstream channel signals, to the central node second WDM port.

5. An optical WDM transmission system according to claim 4, wherein the remote node comprises a cyclic channel multiplexer and band separator/combiner device defining identical basic upstream and downstream channels and identical extension upstream and downstream channels as the basic cyclic multiplexer and band separator/combiner device and the extension cyclic multiplexer and band separator/combiner device of the central node, the cyclic channel multiplexer and band separator/combiner device defining a free spectral range such that the optical frequency difference of corresponding basic and extension downstream and upstream channel signals is an integer multiple of the free spectral range of the cyclic channel multiplexer and band separator/combiner device.

6. An optical WDM transmission system according to claim 5, wherein the cyclic channel multiplexer and band separator/combiner device comprises a cyclic channel multiplexer having a first and second WDM port and a given number of channel ports, the first and second WDM port defining the remote node first and second WDM port, respectively, and each of the channel ports being connected to a WDM port of a 3-port optical band separator/combiner for separating and combining channel signals of the basic and the extension bands, a first band port of each 3-port optical band separator/combiner defining a channel port for an ONU for receiving and transmitting in the basic bands and a second band port of each 3-port optical band separator/combiner defining a channel port for an ONU for receiving and transmitting in the extension bands.

7. An optical WDM transmission system according to claim 5, wherein the remote node cyclic channel multiplexer and band separator/combiner device comprises a first and a second 3-port optical band separator/combiner having a WDM port defining the remote node first and second WDM port and a first and a second band port for receiving and outputting WDM signals in the basic bands and the extension bands, respectively, the first band ports of the first and second 3-port optical band separator/combiners being connected to a first and a second WDM port of a first cyclic channel multiplexer, respectively, and the second band ports of the first and second 3-port optical band separator/combiners being connected to a first and a second WDM port of a second cyclic channel multiplexer, respectively, the first and second cyclic channel multiplexers having channel ports defining the remote node channel ports.

8. An optical WDM transmission system according to claim 5:
wherein the central node further comprises a group of interleave tunable optical transmitters creating a group of interleave downstream channel signals at respective interleave working or protection wavelengths lying within the basic downstream band or the extension downstream band, the channel spacing of the interleave downstream channel signals allowing for combining the interleave downstream channel signals with the group of basic or extension downstream channel signals in an interleaving manner;
wherein the central node basic or extension multiplexer and band separator/combiner device:
receives the group of interleave downstream channel signals and the group of basic or extension downstream signals;
creates a basic or extension downstream WDM working signal including the basic or extension downstream channel signals at their working wavelengths and an interleave downstream WDM working signal including the interleave downstream channel signals at their working wavelengths, and combines these two signals in an interleaving manner into an interleaved downstream WDM working signal; and
creates a basic or extension downstream WDM protection signal including the basic or extension downstream channel signals at their protection wavelengths and an interleave downstream WDM protection signal including the interleave downstream channel signals at their protection wavelengths, and combines these two signals in an interleaving manner into an interleaved downstream WDM protection signal;
wherein the central node further comprises a group of interleave optical receivers for receiving a group of interleave upstream channel signals;
the central node basic or extension multiplexer and band separator/combiner device:
separating a received interleaved upstream WDM working signal into the basic or extension upstream WDM working signal including the basic or extension upstream channel signals and an interleave upstream WDM working signal including interleave upstream channel signals created by a group of interleave ONUs;
demultiplexing the basic or extension upstream WDM working signal and the interleave upstream WDM working signal into the basic or extension upstream channel signals and the interleave upstream channel signals, respectively;
separating a received interleaved upstream WDM protection signal into the basic or extension upstream WDM protection signal including the basic or extension upstream channel signals and an interleave upstream WDM protection signal including interleave upstream channel signals created by the group of interleave ONUs; and
demultiplexing the basic or extension upstream WDM protection signal and the interleave upstream WDM protection signal into the basic or extension upstream channel signals and the interleave upstream channel signals, respectively.

9. An optical WDM transmission system according to claim 8, wherein the remote node comprises:
a first cyclic channel multiplexer having a given number of channel ports connected to the group of basic or extension ONUs, a first cyclic WDM port for receiving a downstream WDM working signal including the basic or extension channel signals at their working wavelengths or outputting an upstream WDM working signal including the basic or extension channel signals at their working wavelengths, and a second cyclic WDM port for receiving a downstream WDM protection signal including the basic or extension channel signals at their protection wavelengths or outputting an upstream WDM protection signal including the basic or extension channel signals at their protection wavelengths;
a second cyclic channel multiplexer having a given number of channel ports connected to the group of interleave ONUs, a first cyclic WDM port for receiving a downstream WDM working signal including the interleave channel signals at their working wavelengths or outputting an upstream WDM working signal including the interleave channel signals at their working wavelengths, and a second cyclic WDM port for receiving a downstream WDM protection signal including the interleave channel signals at their protection wavelengths or outputting an upstream WDM protection signal including the basic or extension channel signals at their interleave wavelengths;
a first passive optical interleaver/de-interleaver device:
for receiving the interleaved downstream WDM working signal at the remote node first WDM port and separating it into the downstream WDM working signal including the basic or extension channel signals and into the downstream WDM working signal including the interleave channel signals; and for receiving the upstream WDM working signal including the basic or extension channel signals and the upstream WDM working signal including the interleave channel signals and combining these upstream WDM working signals in an interleaving manner into an interleaved upstream WDM working signal which is output at the remote node first WDM port; and a second passive optical interleaver/de-interleaver device:
for receiving the interleaved downstream WDM protection signal at the remote node second WDM port and separating it into the downstream WDM protection signal including the basic or extension channel signals and into the downstream WDM protection signal including the interleave channel signals; and for receiving the upstream WDM protection signal including the basic or extension channel signals and the upstream WDM protection signal including the interleave channel signals and combining these upstream WDM working signals in an interleaving manner into an interleaved upstream WDM protection signal which is output at the remote node second WDM port.

10. An optical WDM transmission system according to claim 9, wherein each of the first and second remote node optical interleaver/de-interleaver device comprises a first, a second and a third band separator/combiner device having a WDM port and two band ports, a first band port for outputting or receiving the basic or extension downstream band and a second band port for outputting or receiving the basic or extension upstream band, and an optical interleaver having a common port and a first interleave port for receiving the upstream WDM signal including the basic or extension channel signals and a second interleave port for receiving the upstream WDM signal including the interleave channel signals, and an optical de-interleaver, having a common port and a first interleave port for outputting the downstream WDM signal including the basic or extension channel signals and a second interleave port for outputting the downstream WDM signal including the interleave channel signals;

the WDM port of the first band separator/combiner device being connected to the remote node first WDM port, the first band port of the first band separator/combiner device being connected to a common port of the optical interleaver and the second band port being connected to a common port of the optical de-interleaver;

the first band port of the second band separator/combiner device being connected to the first band port of the optical de-interleaver, and the second band port of the second band separator/combiner device being connected to the first interleave port of the optical interleaver, and the WDM port of the second band separator/combiner device being connected, in case of the first remote node optical interleaver/de-interleaver device, to the first WDM output port of the first cyclic channel multiplexer, or, in case of the second remote node optical interleaver/de-interleaver device, to the second WDM output port of the first cyclic channel multiplexer;

the first band port of the third band separator/combiner device being connected to the second band port of the optical de-interleaver, and the second band port of the third band separator/combiner device being connected to the second interleave port of the optical interleaver, and the WDM port of the third band separator/combiner device being connected, in case of the first remote node optical interleaver/de-interleaver device, to the first WDM output port of the second cyclic channel multiplexer or, in case of the second remote node optical interleaver/de-interleaver device, to the second WDM output port of the second cyclic channel multiplexer.

11. An optical WDM transmission system according to claim 1, wherein the central node cyclic multiplexer and band separator/combiner device comprises one or more passive optical cyclic channel multiplexers having a predetermined number of channel ports and two cyclic WDM ports and of one or more optical band separator/combiners having a WDM port and a first band port for receiving or outputting a respective downstream band and a second band port for receiving or outputting a respective upstream band.

12. An optical WDM transmission system according to claim 1, wherein one or more of the cyclic channel multiplexers are cyclic arrayed waveguide gratings having a predetermined number of channel ports and two cyclic WDM ports.

13. An optical WDM transmission system according to claim 1, wherein one or more of the optical band separator/combiners are realized as 3-port optical band separator/combiners of one or more of the following kinds:
a 3-port optical band multiplexer having a common WDM port and two band ports,
an optical diplexer, and/or
a 3-port optical circulator.

14. An optical WDM transmission system according to claim 1, wherein the central node, within at least one of the paths of the basic or extension or interleaved downstream WDM working and protection signals, comprises a controllable optical amplifier which is controllable by the protection control unit, in particular with respect to its amplification factor.

15. An optical WDM transmission system according to claim 1, wherein the central node, within at least one of the paths of the basic or extension or interleaved upstream WDM working and protection signals, comprises a controllable optical amplifier which is controllable by the protection control unit, in particular with respect to its amplification factor.

16. An optical WDM transmission system according to claim 2, wherein the remote node cyclic multiplexer and band separator/combiner device comprises one or more passive optical cyclic channel multiplexers having a predetermined number of channel ports and two cyclic WDM ports and of one or more optical band separator/combiners having a WDM port and a first band port for receiving or outputting a respective downstream band and a second band port for receiving or outputting a respective upstream band.

* * * * *

UNITED STATES PATENT AND TRADEMARK OFFICE
CERTIFICATE OF CORRECTION

| | | |
|---|---|---|
| PATENT NO. | : 8,705,952 B2 | Page 1 of 1 |
| APPLICATION NO. | : 13/328759 | |
| DATED | : April 22, 2014 | |
| INVENTOR(S) | : Grobe et al. | |

It is certified that error appears in the above-identified patent and that said Letters Patent is hereby corrected as shown below:

Title Page: Item 73

The Assignee is incorrectly identified as --- ADVA AG Optical Networking --- and should be correctly identified as --- ADVA Optical Networking SE ---

Signed and Sealed this
Twenty-second Day of December, 2015

Michelle K. Lee
*Director of the United States Patent and Trademark Office*